United States Patent
Aurongzeb et al.

(10) Patent No.: US 12,164,701 B1
(45) Date of Patent: Dec. 10, 2024

(54) SUSTAINABLE SYSTEM AND METHOD OF ASSEMBLING USER-UPGRADEABLE MODULAR-COMPONENT KEYBOARD

(71) Applicant: Dell Products, LP, Round Rock, TX (US)

(72) Inventors: Deeder M. Aurongzeb, Austin, TX (US); Weijong Sheu, Austin, TX (US); Peng Lip Goh, Singapore (SG)

(73) Assignee: DELL PRODUCTS LP, Round Rock, TX (US)

( * ) Notice: Subject to any disclaimer, the term of this patent is extended or adjusted under 35 U.S.C. 154(b) by 0 days.

(21) Appl. No.: 18/384,086

(22) Filed: Oct. 26, 2023

(51) Int. Cl.
*G06F 3/02* (2006.01)
*H01H 13/81* (2006.01)

(52) U.S. Cl.
CPC .......... *G06F 3/0219* (2013.01); *H01H 13/81* (2013.01); *H01H 2239/058* (2013.01)

(58) Field of Classification Search
CPC . G06F 3/0219; H01H 13/81; H01H 2239/058
See application file for complete search history.

(56) References Cited

U.S. PATENT DOCUMENTS

| | | | |
|---|---|---|---|
| 6,104,604 A | 8/2000 | Anderson | |
| 6,944,012 B2 | 9/2005 | Doczy | |
| 6,965,076 B2 | 11/2005 | Wu | |
| 9,176,591 B2 | 11/2015 | Nair | |
| 9,600,085 B1* | 3/2017 | Bruno | G06F 3/0227 |
| 9,760,184 B2* | 9/2017 | Chang | G06F 1/1632 |
| 10,331,344 B2* | 6/2019 | Lutnick | G06F 3/0489 |
| 10,860,112 B1* | 12/2020 | Knoppert | G06F 3/044 |
| 11,347,314 B2* | 5/2022 | Knoppert | G06F 3/016 |
| 11,880,511 B1* | 1/2024 | Benjamin | G06F 3/0237 |
| 2004/0070931 A1 | 4/2004 | Wu | |
| 2008/0037204 A1 | 2/2008 | Cohen | |
| 2024/0013991 A1* | 1/2024 | Siu | H05K 1/181 |

FOREIGN PATENT DOCUMENTS

WO 02/17696 A1 2/2002

* cited by examiner

*Primary Examiner* — Vinh T Lam
(74) *Attorney, Agent, or Firm* — Prol Intellectual Property Law, PLLC; H. Kenneth Prol

(57) ABSTRACT

A user-upgradeable modular component keyboard for an information handling system comprising a replaceable keyboard layout structure having a plurality of keys and operatively coupled to a replaceable keyboard power and connectivity module via a key switch data connector and a releasable fastener. The replaceable keyboard power and connectivity module housing a keyboard controller for communicating detected keystrokes to the information handling system and a power source for powering the keyboard controller, the replaceable keyboard power and connectivity module having a key switch data connector first side to operatively couple to a key switch data connector second side on the replaceable keyboard layout structure for transfer of data and power, and the replaceable keyboard power and connectivity module having a releasable fastener first side for operative coupling to a releasable fastener second side on the replaceable keyboard layout structure.

20 Claims, 10 Drawing Sheets

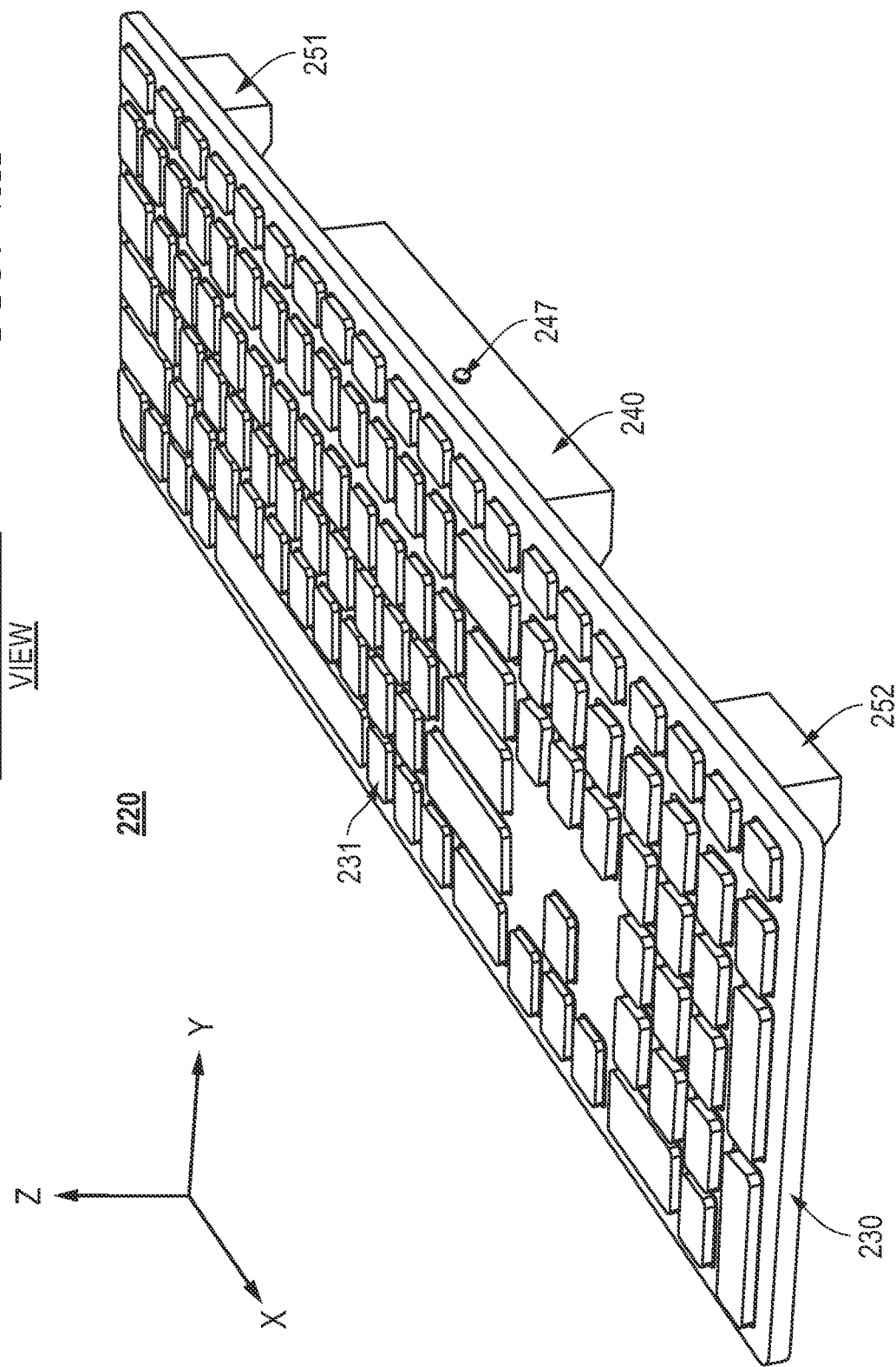

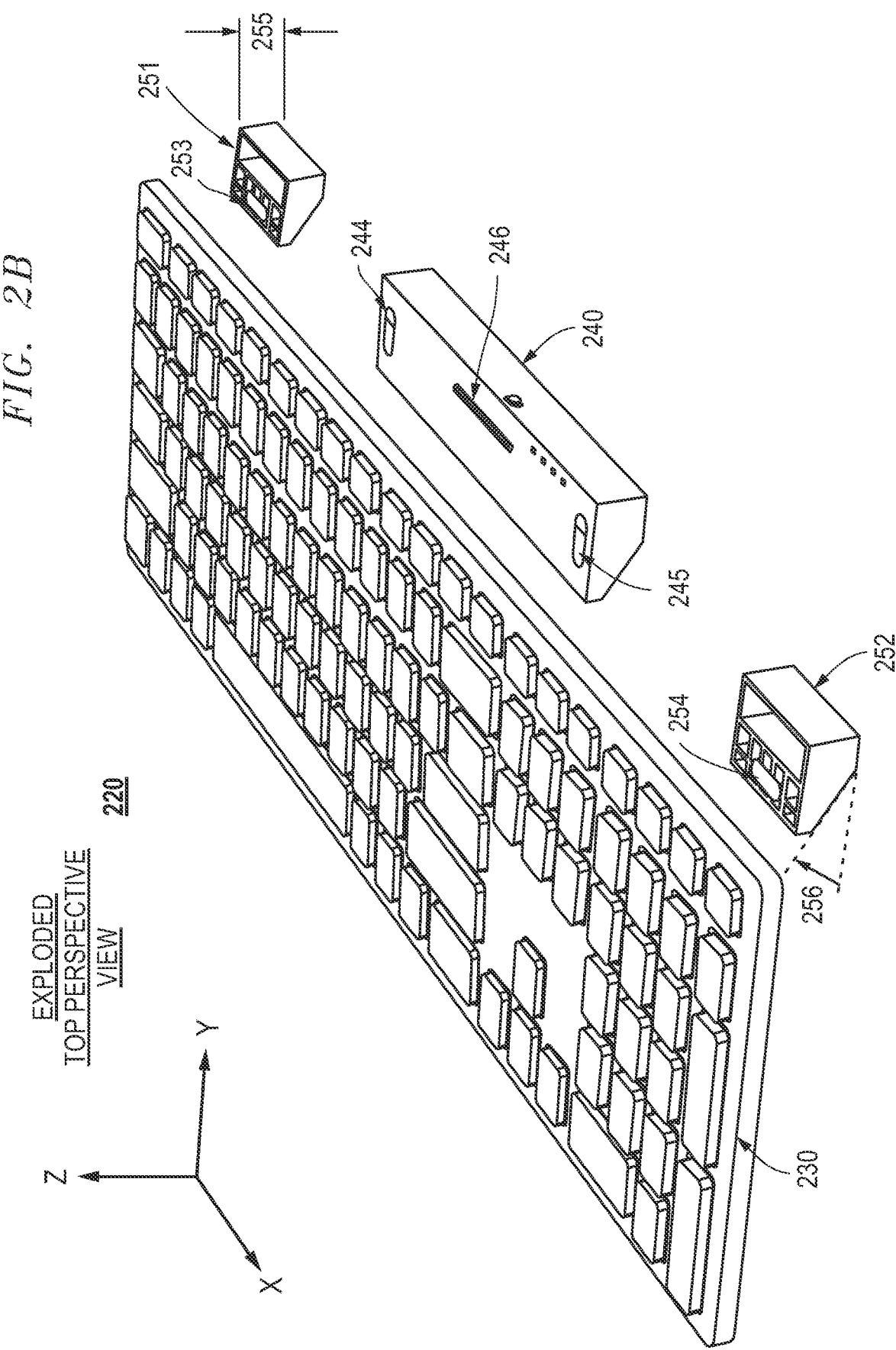

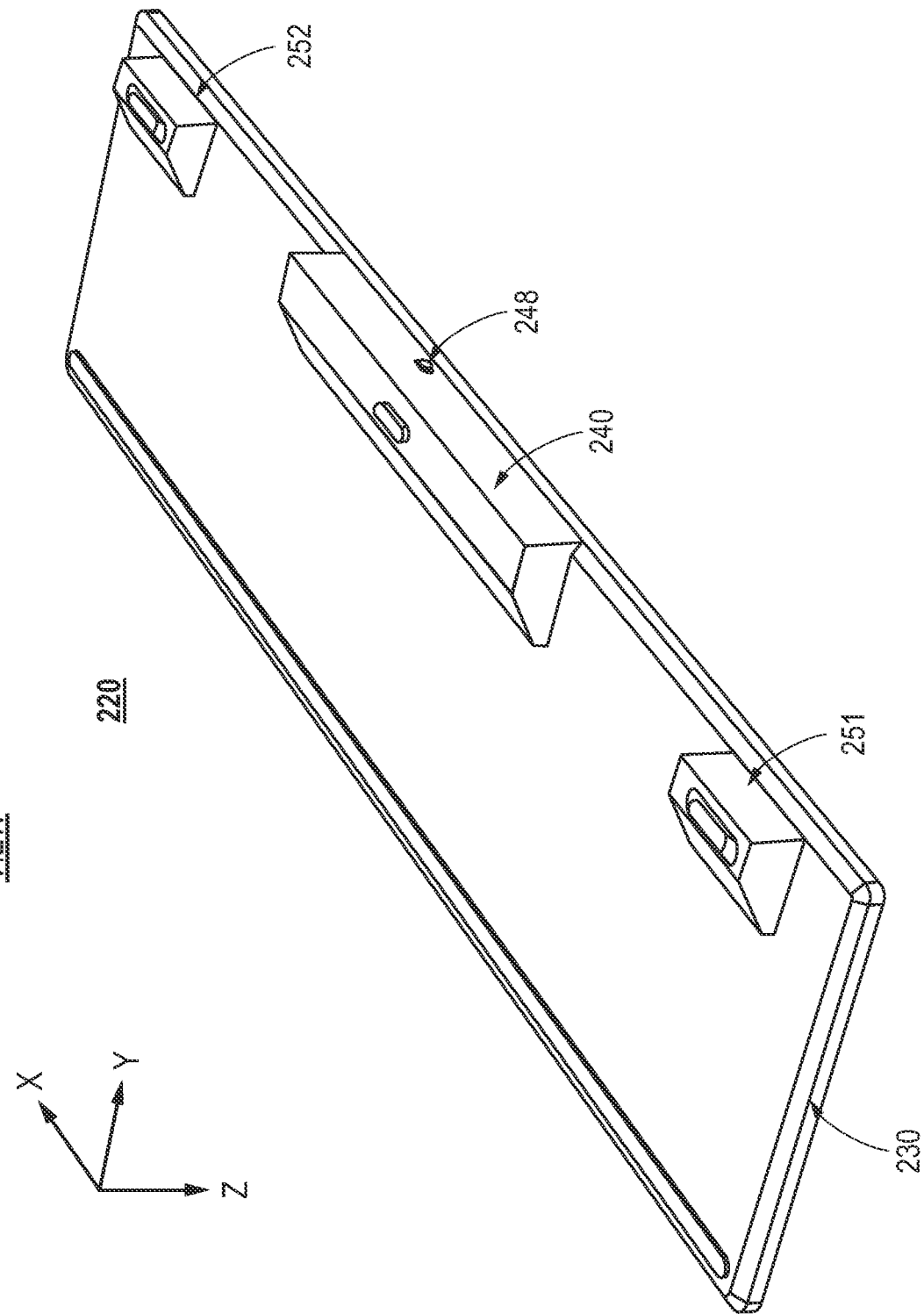

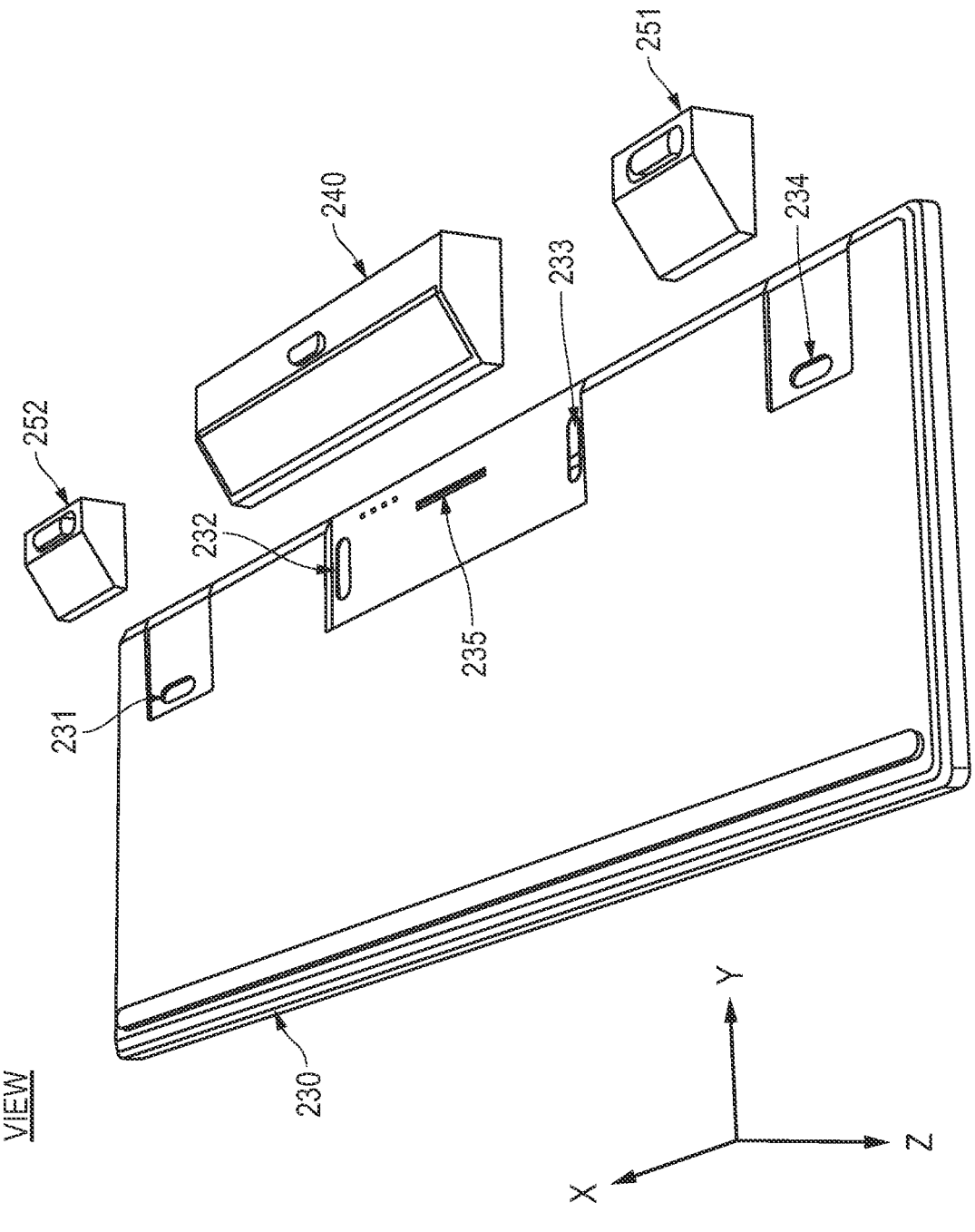

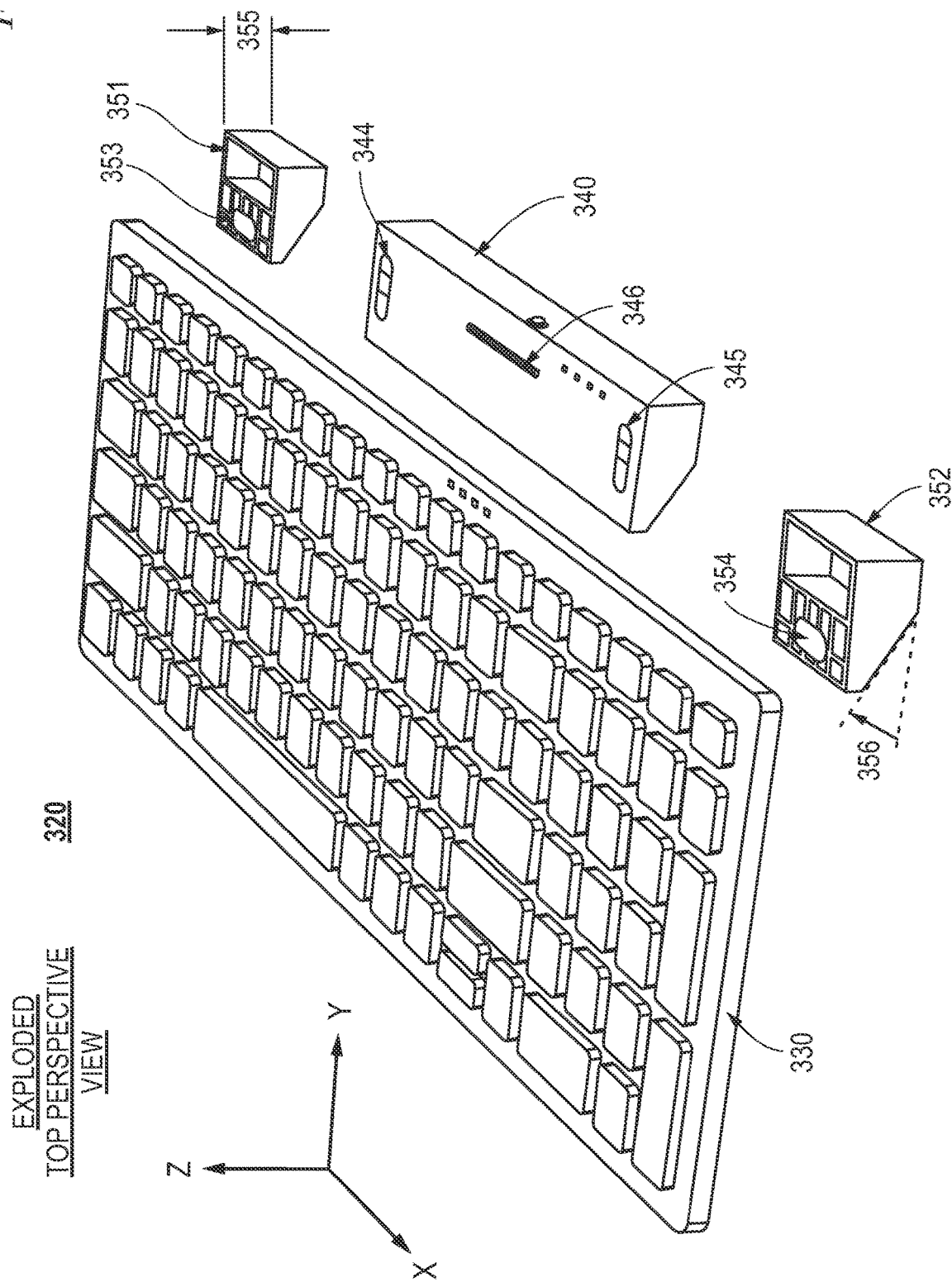

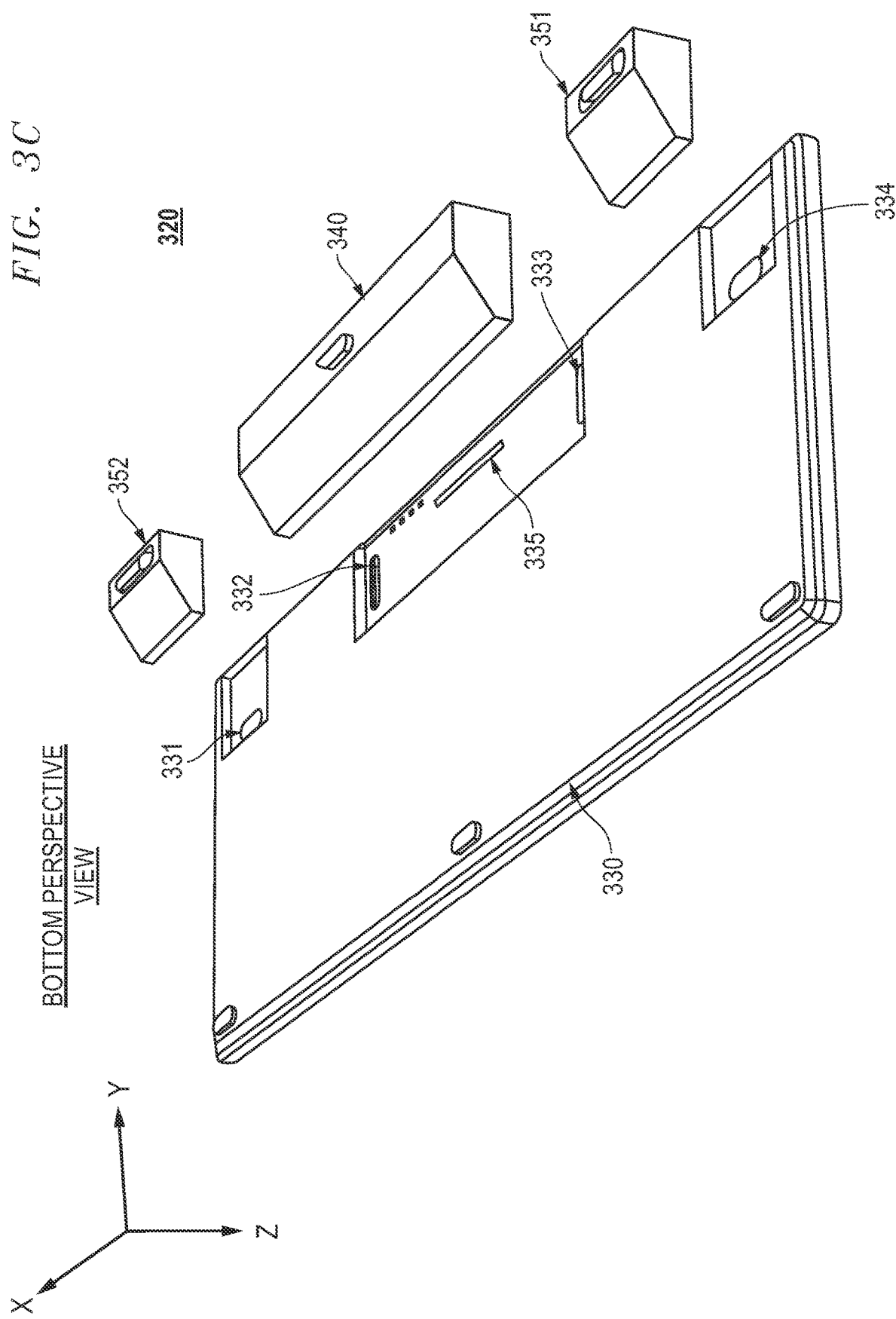

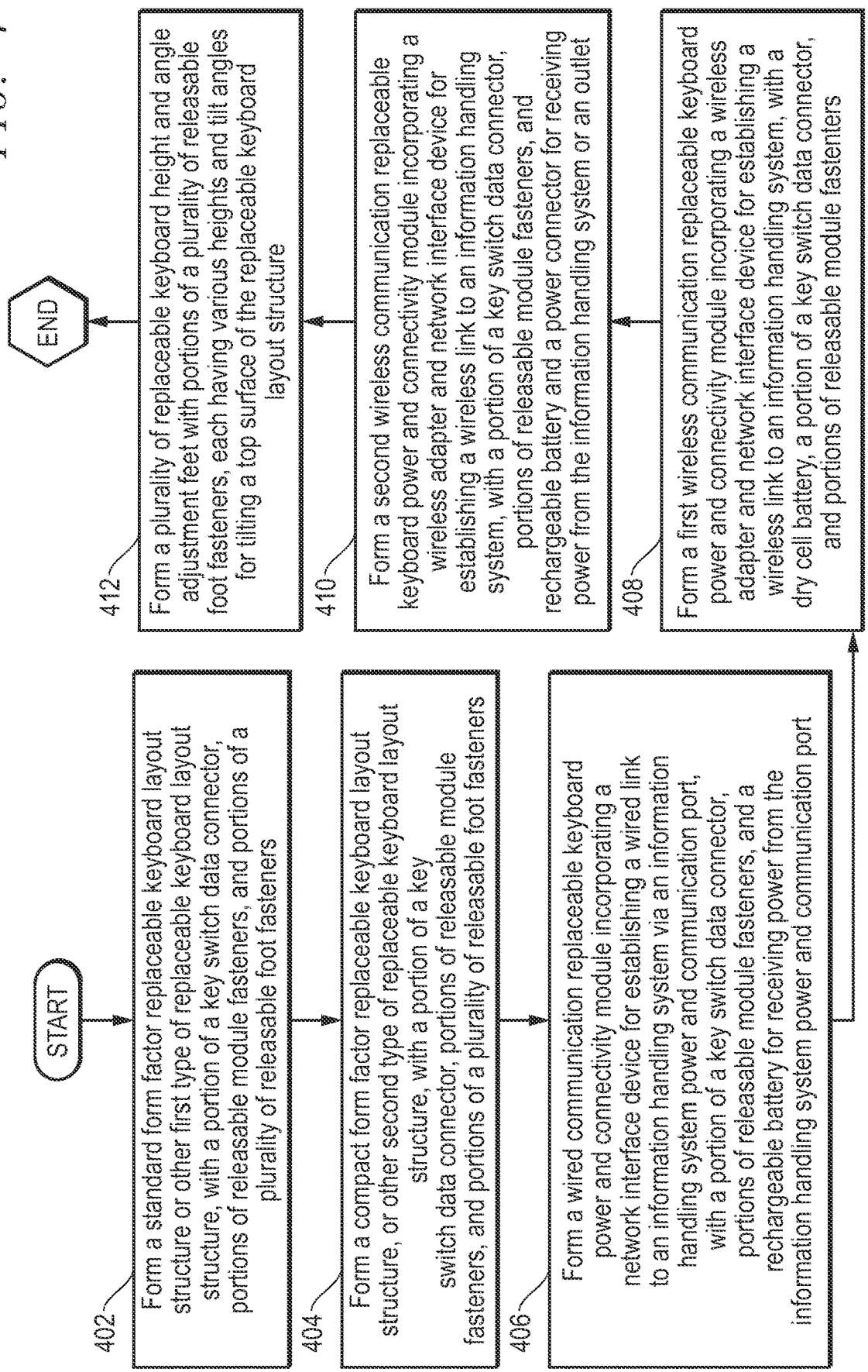

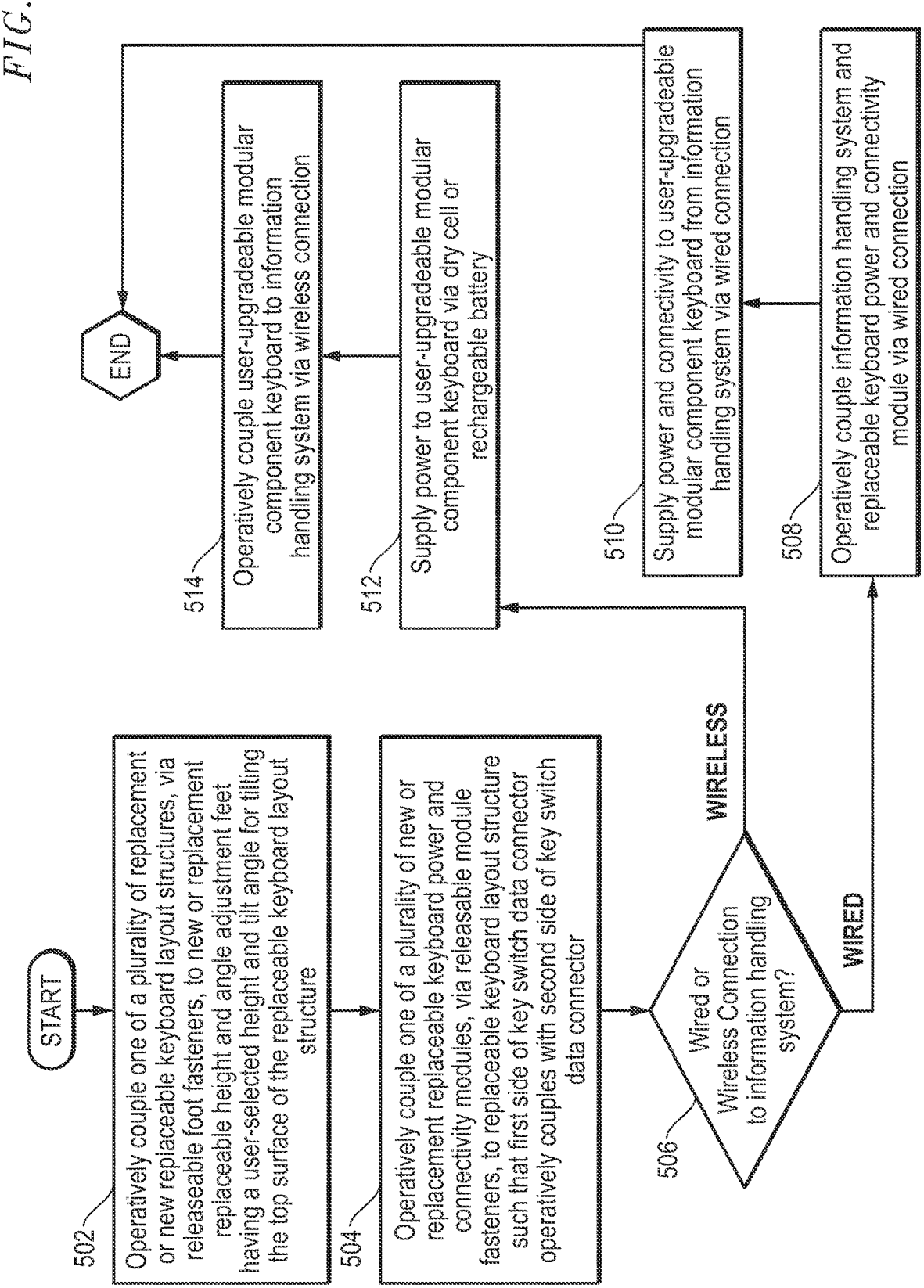

SUSTAINABLE SYSTEM AND METHOD OF ASSEMBLING USER-UPGRADEABLE MODULAR-COMPONENT KEYBOARD

FIELD OF THE DISCLOSURE

The present disclosure generally relates to assembly of a keyboard for an information handling system. More specifically, the present disclosure relates to the sustainable assembly, upgrade and repair of a keyboard with modular, user-replaceable components for decreasing waste caused by disposal of an entire keyboard assembly due to a user's wish to upgrade individual features, or failure, or breakage of single components housed therein.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include one or more connectors for peripheral input/output devices that may also include a keyboard, for example.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 2A is a graphical diagram illustrating a top perspective view of a standard form factor user-upgradeable modular-component keyboard according to an embodiment of the present disclosure;

FIG. 2B is a graphical diagram illustrating an exploded top perspective view of modular components for a standard form factor user-upgradeable modular-component keyboard according to an embodiment of the present disclosure;

FIG. 2C is a graphical diagram illustrating a bottom perspective view of a wireless user-upgradeable modular-component keyboard according to an embodiment of the present disclosure;

FIG. 2D is a graphical diagram illustrating an exploded bottom perspective view of replaceable modular components for operative coupling with a standard form factor keyboard layout structure according to an embodiment of the present disclosure;

FIG. 3B is a graphical diagram illustrating an exploded top perspective view of modular components for a component form factor user-upgradeable modular-component keyboard according to an embodiment of the present disclosure;

FIG. 3C is a graphical diagram illustrating an exploded bottom perspective view of replaceable modular components for operative coupling with a compact form factor keyboard layout structure according to an embodiment of the present disclosure;

FIG. 4 is a flow diagram illustrating a method of forming a plurality of modular components for a user-upgradeable modular-component keyboard according to an embodiment of the present disclosure; and FIG. 5 is a flow diagram illustrating a method of assembling a plurality of modular components together to form a user-upgradeable modular-component keyboard according to an embodiment of the present disclosure.

The use of the same reference symbols in different drawings may indicate similar or identical items.

DETAILED DESCRIPTION OF THE DRAWINGS

Figure 1:
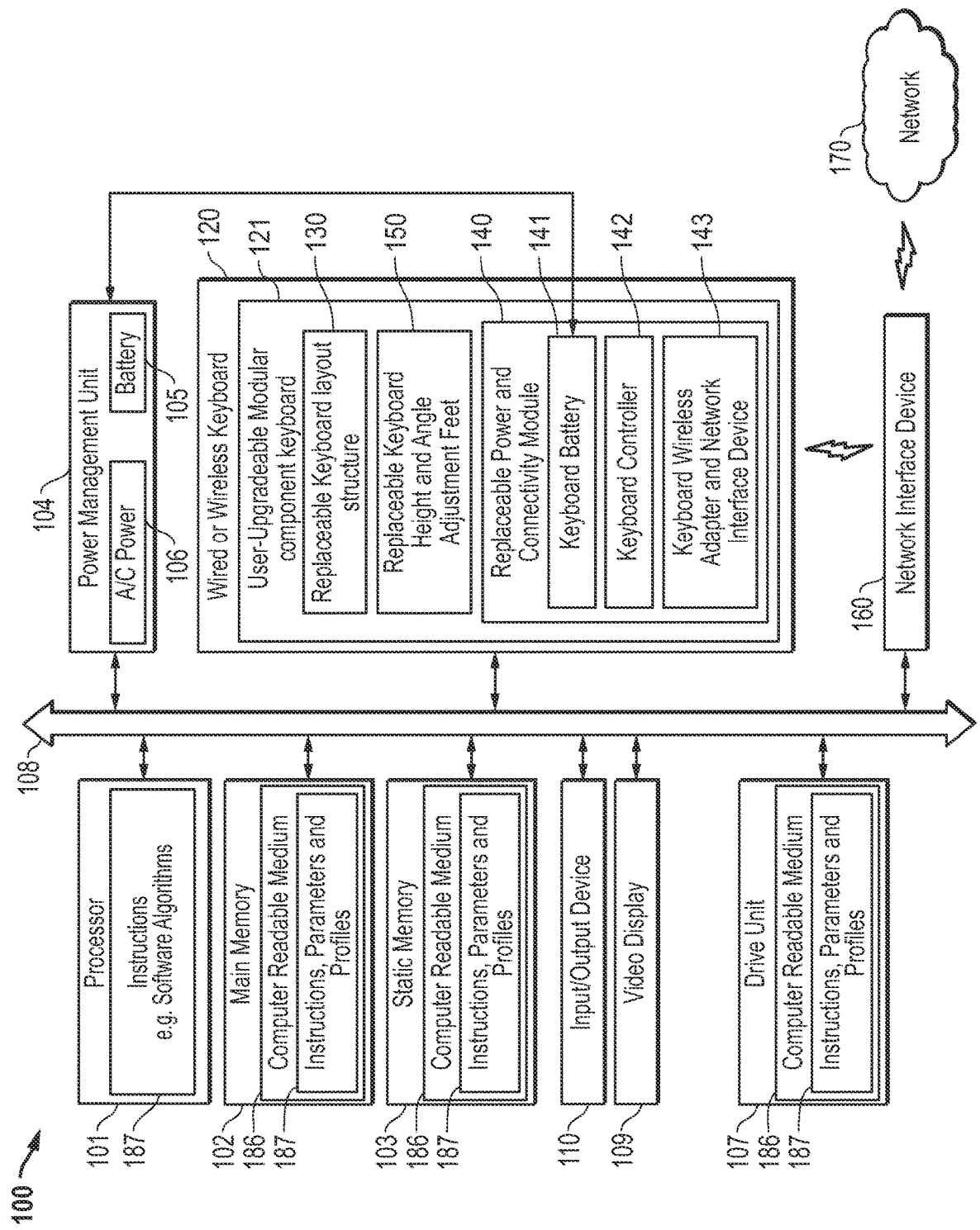
FIG. 1 is a block diagram illustrating an information handling system operatively coupled to a user-upgradeable modular-component keyboard according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Keyboard assemblies for information handling systems may include multiple hardware components that wear, break, or become ready for upgrade at different times than other of such components. For example, keyboard assemblies in existing systems may include the keyboard layout, power source, connectivity components such as network interface devices or various input/output connectors, and keyboard tilt mechanisms such as feet or other angled supports. Any one of these components in existing systems may break, wear down, or otherwise require replacement while the other components of the keyboard assembly remain fully functional. In addition, a user or information technology (IT) manager may wish to upgrade or replace any one of these hardware components individually, for better performance, to address changing connectivity needs, such as switching from a wired connection to a wireless connection or vice versa, or for aesthetic reasons, such as to change the tilt of the keyboard. In existing systems, in order to perform any one of these changes to a single one of such components, the entire keyboard assembly may be replaced, despite remaining usefulness of various hardware components in the keyboards, resulting in undo waste and environmental impacts.

The user-upgradeable modular-component keyboard in embodiments of the present disclosure address these issues by providing a plurality of interchangeable modular-components that may be combined in a plurality of ways to provide various power and connectivity functionalities and aesthetics. For example, a user-upgradeable modular component keyboard in embodiments of the present disclosure may be assembled by operatively coupling one of a plurality of available types of replaceable keyboard layouts of keys or types of keyboard keys (e.g., haptic, dome, colors, lighting, or other various keyboard structures) with one of a plurality of available types of replaceable keyboard power and connectivity modules, each providing varying combinations of connectivity capabilities and power sources. In addition, a plurality of replaceable keyboard height and angle adjustment feet may be operatively coupled to the replaceable keyboard layout structure, with each set of feet providing a different angle or height at which the user-repairable module component keyboard may tilt with respect to the surface on which it is set by a user.

Each of these various components in embodiments of the present disclosure may be mixed and matched due to a universality of the fasteners and key switch data connectors for operatively connecting each of these components. For example, each of a plurality of different types of replaceable keyboard layouts of keys or types of keyboard keys (e.g., haptic, dome, colors, lighting, or other various types of keyboard structures) may be formed in embodiments herein, including a standard form factor and a compact form factor replaceable keyboard layout structure. Each of the plurality of different types of replaceable keyboard layout structures in embodiments may include universal keyboard-sided module fasteners for a releasable fastener and a keyboard layout structure port connector of a key switch data connector for operatively coupling with one of a plurality of available replaceable keyboard power and connectivity modules, and keyboard-sided foot fasteners as a releasable fastener for operative coupling to a plurality of replaceable keyboard height and angle adjustment feet. As another example, each of a plurality of different types of replaceable keyboard power and connectivity modules may be formed in embodiments herein, for wired or wireless connection to an information handling system, and including either a dry cell battery or a rechargeable battery. Each of the plurality of different types of replaceable keyboard power and connectivity modules in embodiments may include universal module-sided keyboard fasteners and a keyboard power and connectivity module port for operatively coupling with one of a plurality of available replaceable keyboard layout structures, which may include different types of keyboards and keyboard keys in embodiments. In still another example, each of a plurality of different types of replaceable keyboard height and angle adjustment feet may be formed in embodiments herein, having various heights and tilt angles. Each of the plurality of different types of replaceable keyboard height and angle adjustment feet in embodiments may include universal foot-sided keyboard fasteners for operative coupling to a plurality of replaceable keyboard layout structures.

A user who wishes to continue to use most of these components, such as the replaceable keyboard layout structure, the replaceable keyboard power and connectivity module, or the replaceable keyboard height and angle adjustment feet, but would like to upgrade, replace, or adjust functionality of only one of these components may exchange the undesirable or broken component with a new or upgraded version of that component. The user in such a case may make such an exchange without having to replace and dispose of the remaining, currently functional components with which the user is satisfied. In such a way, assembly of the user-upgradable modular-component keyboard may decrease waste associated with upgrading or replacing keyboards.

FIG. 1 illustrates an information handling system 100 according to several aspects of the present disclosure. In various embodiments described herein, a user-upgradeable modular component keyboard 121 of a wired or wireless keyboard 120 may be operatively coupled to the information handling system 100 such that various damaged or upgradeable components of the user-upgradeable modular component keyboard 121 may be removable and replaceable with respect to other functioning components of the user-upgradeable modular component keyboard 121 and with respect to the information handling system 100 or across plural wired or wireless keyboards 120 that may be part of an enterprise. This may allow for replacement of damaged or upgradeable components of the user-upgradeable modular component keyboard 121 among a group of wired and wireless keyboards 120, rather than replacement of the user-upgradeable modular component keyboard 121 of the entire wired or wireless keyboard 120. Such modularity may result in decreased waste and positive environmental impacts such as longer life of wired or wireless keyboards 120.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. The information handling system 100 may include a memory 102, (with computer readable medium 186 that is volatile (e.g. random-access memory, etc.), nonvolatile memory (read-only memory, flash memory etc.) or any combination thereof), one or more hardware processing resources, such as a central processing unit (CPU), a graphics processing unit (GPU), a Visual Processing Unit (VPU) or a Hardware Accelerator, any one of which may be the hardware processor 101 illustrated in FIG. 1, hardware control logic, or any combination thereof. Additional components of the information handling system 100 may include one or more storage devices 103 or 107, a wireless network interface device 160, various input and output (I/O) devices 110, a keyboard 120, or any combination thereof. A power management unit 104 supplying power to the information handling system 100, via a battery 105 or an alternating current (A/C) power adapter 106 may supply power to one or more components of the information handling system 100, including the hardware processor 101, or other hardware processing resources executing code instructions, the wireless network interface device 160, a static memory 103 or drive unit 107, a video display 109, wired or wireless keyboard 120, or other components of an information handling system. Battery 105 or A/C power adapter 106 may be operatively coupled to the keyboard battery 141 via an electrically conductive wire 199 if the keyboard 120 is wired. In an alternative embodiment, keyboard 120 may be wireless and be powered with a keyboard battery 141 that is rechargeable or a replaceable dry cell battery. The video display 109 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components.

The user-upgradeable modular-component keyboard 121 in an embodiment may incorporate interchangeable, modular-components that may be combined in a plurality of ways among a plurality of wired or wireless keyboards 120, such as part of an enterprise, to provide various power and connectivity functionalities and aesthetics. For example, a user-upgradeable modular component keyboard 121 in an embodiment may incorporate one of a plurality of available types of replaceable keyboard layout structures 130, with each type employing either a compact form factor or a standard form factor or having different key types such as haptic, dome type, scissor type, short stroke, long stroke, quiet key designs, or other keyboard layout structures. As another example, a user-upgradeable modular component keyboard 121 in an embodiment may incorporate one of a plurality of available types of replaceable keyboard power and connectivity modules 140, each providing varying combinations of connectivity capabilities and power sources. In yet another example, a user-upgradeable modular component keyboard 121 in an embodiment may incorporate one of a plurality of available types of replaceable keyboard height and angle adjustment feet 150, with each set of feet providing a different angle or height at which the user-repairable module component keyboard may tilt with respect to the surface on which it is set by a user.

In order to provide varying functionalities in various embodiments herein, the replaceable keyboard power and connectivity module 140 in an embodiment may incorporate one of a plurality of connectivity hardware types and one of a plurality of power sources. For example, the replaceable keyboard power and connectivity module 140 in an embodiment may include a dry cell or rechargeable keyboard battery 141 for supplying power to a keyboard controller 142 and to a keyboard wireless adapter or network interface device 143. The keyboard controller 142 in an embodiment may include a microprocessor such as a keyboard microcontroller, and may operate to detect user press of keys within the replaceable keyboard layout structure 121, and to transmit an indication of such a detected key press as a keystroke to the hardware processor 101 via the keyboard wireless adapter or network interface device 143. In various embodiments herein, the replaceable keyboard power and connectivity module 140 may operate to establish wired or wireless links with the information handling system 100 to communicate such information to the hardware processor 101. For example, in an embodiment, the replaceable keyboard power and connectivity module 140 may establish a wired link with the information handling system 100, and hardware processor 101 via a Universal Serial Bus C (USB-C) connection, or other type of USB connection. As another example, the replaceable keyboard power and connectivity module 140 in an embodiment may establish a wireless link with the information handling system 100 via a wireless connection between the keyboard wireless adapter and network interface device 143 and the network interface device 160. More specifically, such a wireless link may be established in accordance with wide personal area network (WPAN) standards, including Bluetooth® technology, or Bluetooth Low Energy (BLE) technology.

The information handling system 100 may execute code instructions 187, via one or more hardware processing resources, that may operate on servers or systems, remote data centers, or on-box in individual client information handling systems 100 according to various embodiments herein. In some embodiments, it is understood any or all portions of code instructions 187 may operate on a plurality of information handling systems 100.

The information handling system 100 may include a hardware processor 101 such as a central processing unit (CPU), a graphics processing unit (GPU), a Visual Processing Unit (VPU), or a hardware accelerator, embedded controllers or hardware control logic or some combination of the same. Any of the hardware processing resources may operate to execute code that is either firmware or software code. Moreover, the information handling system 100 may include memory such as main memory 102, static memory 103, containing computer readable medium 186 storing instructions 187. In other embodiments the information handling system 100 may represent a server information handling system executing operating system (OS) software, application software, BIOS software, or other software applications or drivers detectable by hardware processor type 101. The disk drive unit 107 and static memory 103 may also contain space for data storage in a computer readable medium 186. The instructions 187 in an embodiment may reside completely, or at least partially, within the main memory 102, the static memory 103, and/or within the disk drive 107 during execution by the hardware processor 101.

The wireless adapter and network interface device 160 may provide connectivity of the information handling system 100 to wireless peripheral devices such as keyboard 120 or to the network 170 via a network access point (AP) in an embodiment. The network 170 in some embodiments may be a wired local area network (LAN), a wireless personal area network (WPAN) including a Bluetooth® or Bluetooth® Low Energy (BLE) WPAN, a public Wi-Fi communication network, a private Wi-Fi communication network, a public WiMAX communication network, or other non-cellular communication networks. In other embodiments, the network 170 may be a wired wide area network (WAN), a 4G LTE public network, or a 5G communication network, or other cellular communication networks. Connectivity to any of a plurality of networks 170, one or more APs for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

The network interface device 160 may operate in accordance with any cellular wireless data communication standards. To communicate with a wireless local area network, standards including IEEE 802.11 WLAN standards, IEEE 802.15 WPAN standards, WiMAX, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax/be including Wi-Fi 6, Wi-Fi 6e, and the emerging Wi-Fi 7 standard. It is understood that any number of available channels may be available in WLAN under the 2.4 GHz, 5 GHZ, or 6 GHz bands which may be shared communication frequency bands with WWAN protocols or Bluetooth® protocols in some embodiments.

In some embodiments, hardware executing software or firmware, dedicated hardware implementations such as application specific integrated circuits, programmable logic arrays and other hardware devices may be constructed to implement one or more of some systems and methods described herein. Applications that may include the hardware processing resources executing systems of various embodiments may broadly include a variety of electronic and computer systems. One or more embodiments described herein may implement functions using two or more specific interconnected hardware modules or devices with related control and data signals that may be communicated between and through the hardware modules, or as portions of an application-specific integrated circuit. Accordingly, the present embodiments encompass hardware processing resources executing software or firmware, or hardware implementations.

In accordance with various embodiments of the present disclosure, the methods described herein may be implemented by firmware or software programs executable by a hardware controller, a hardware processor system, or other hardware processing resources. Further, in an exemplary, non-limited embodiment, implementations may include distributed processing, component/object distributed processing, and parallel processing. Alternatively, virtual computer system processing may be constructed to implement one or more of the methods or functionalities as described herein. Various software modules comprising application instructions 187 may be coordinated by an operating system (OS), and/or via an application programming interface (API). An example operating system may include Windows®, Android®, and other OS types. Example APIs may include Win 32, Core Java API, or Android APIs. Application instructions 187 may also include any application processing drivers, or the like executing on information handling system 100.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 187 may be stored in static memory 103, or the drive unit 107 on a computer-readable medium 186 such as a flash memory or magnetic disk in an example embodiment.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a hardware processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware, or as software or firmware executing on a hardware processing resource. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The hardware system, hardware device, hardware controller, or hardware module may execute software, including firmware embedded at a device, such as an Intel® brand hardware processor, ARM® brand hardware processors, Qualcomm® brand hardware processors, or other hardware processors and chipsets, or other such device, or software capable of operating a relevant environment of the information handling system. The hardware system, hardware device, hardware controller, or hardware module may also comprise a combination of the foregoing examples of hardware, or hardware processors executing firmware or software. In an embodiment an information handling system 100 may include an integrated circuit or a board-level product having portions thereof that may also be any combination of hardware and hardware executing software. Hardware devices, hardware modules, hardware resources, or hardware controllers that are in communication with one another need not be in continuous communication with each other, unless expressly specified otherwise. In addition, hardware devices, hardware modules, hardware resources, or hardware controllers that are in communication with one another may communicate directly or indirectly through one or more intermediaries.

FIG. 2A is a graphical diagram illustrating a top perspective view of a user-upgradeable modular-component keyboard with a standard form factor replaceable keyboard layout structure according to an embodiment of the present disclosure. The user-upgradeable modular-component keyboard 220 in an embodiment may incorporate a plurality of interchangeable, modular components having various functionalities, of which the particular configuration of FIG. 2A is just one. It is contemplated that any of the replaceable keyboard layout structure 230, replaceable keyboard power and connectivity module 240, or replaceable keyboard height and angle adjustment feet 251 and 252 discussed herein in an embodiment with respect to FIG. 2A may be interchangeable with corresponding components of other embodiments described herein. The user-upgradeable modular-component keyboard 220 in an embodiment of FIG. 2A may include a standard form factor replaceable keyboard layout structure 230, a wired replaceable keyboard power and connectivity module 240 for establishing a wired connection with an information handling system, and replaceable keyboard height and angle adjustment feet 251 and 252 of a first height and a first angle.

A standard form factor replaceable keyboard layout structure 230 may be formed in an embodiment, with a plurality of keys 231. In various embodiments described herein, a standard form factor replaceable keyboard layout structure 230 may differ from a compact form factor in that the standard form factor includes a wider keyboard layout that separates the number keys from the letter keys in accordance with traditional typewriter keyboards. Other variations of replaceable keyboard layout structures 230 may relate to types of keys or key mechanisms used for the keyboard, colors, backlighting, operational characteristics of the keys, or other keyboard type options. For example, various replaceable keyboard layout structures 230 in an embodiment may include haptic, dome, scissor, long stroke or short stroke key, quiet key, or other key assemblies.

The replaceable keyboard layout structure 230 in an embodiment may be operatively coupled to one of a plurality of different types of replaceable keyboard power and connectivity modules 240. In various embodiments herein, the replaceable keyboard power and connectivity module 240 may be wired or wireless so that the user-upgradeable modular-component keyboard 220 may operate as a wired or a wireless keyboard. In embodiments in which the replaceable keyboard power and connectivity module 240 operates as a wired keyboard, the replaceable keyboard power and connectivity module 240 may include a power and communication port 247 for the transfer of power and data via a wire connecting to the information handling system. In such a way, the wired replaceable keyboard power and connectivity module 240 may establish a wired operative coupling with the information handling system. Other embodiments of the replaceable keyboard power and connectivity module 240 may be wireless, and may further include wireless adapters or network interface devices with a keyboard wireless radio for establishing wireless links with the information handling system, as described in greater detail herein. In such embodiments, as described in greater detail below, the wireless replaceable keyboard power and connectivity module 240 may be powered by and further include a dry cell or rechargeable battery.

The information handling system may be operatively coupled to the replaceable wired keyboard power and connectivity module 240 in an embodiment described with respect to FIG. 2A via wired connection through the information handling system power and communication port 247, which may comprise a Universal Serial Bus (USB-C) connection capable of transmitting power and data, for example. Upon such an operative coupling, power may be supplied, and data transferred in an embodiment to the user-upgradeable modular component keyboard 220 from the information handling system via a wired connection (e.g., USB-C) through the information handling system power and communication port 247.

The replaceable keyboard power and connectivity module 240 operatively coupled to the standard form factor replaceable keyboard layout structure 230 in such an embodiment may be a new or replacement component in another embodiment. For example, a user who wishes to continue to use the standard form factor replaceable keyboard layout structure 230 and the replaceable height and angle adjustment feet 251 and 252, but would like to upgrade, replace, or adjust functionality of the replaceable keyboard power and connectivity module 240 may exchange the wired replaceable keyboard power and connectivity module 240 for a wireless replaceable keyboard power and connectivity module, or a new or upgraded wired replaceable keyboard power and connectivity module. The user in such a case may make such an exchange without having to replace and dispose of the replaceable keyboard layout structure 230 or the replaceable keyboard height and angle adjustment feet 251 and 252. In such a way, assembly of the user-upgradable modular-component keyboard 220 may decrease waste associated with upgrading keyboards.

The standard form factor replaceable keyboard layout structure 230 in an embodiment may be a new or replacement component in another embodiment. For example, a user who wishes to continue to use the replaceable keyboard power and connectivity module 240 and the replaceable height and angle adjustment feet 251 and 252, but would like to upgrade, replace, or adjust the form factor of the replaceable keyboard layout structure 230 may exchange the standard form factor replaceable keyboard layout structure 230 for a compact form factor replaceable keyboard layout structure described in greater detail below with respect to FIG. 3A, or a new or upgraded standard form factor replaceable keyboard layout structure 230 or structure with different types of keyboard keys such as haptic, dome, scissor, short stroke, long stroke, various colors or various materials, etc. The user in such a case may make such an exchange without having to replace and dispose of the replaceable keyboard power and connectivity module 240 or the replaceable keyboard height and angle adjustment feet 251 and 252. In such a way, assembly of the user-upgradable modular-component keyboard 220 may decrease waste associated with upgrading keyboards.

FIG. 2B is a graphical diagram illustrating an exploded top perspective view of a standard form factor user-upgradeable modular-component keyboard with a plurality of replaceable modular components according to an embodiment of the present disclosure. The user-upgradeable modular-component keyboard 220 in an embodiment may incorporate a plurality of interchangeable, modular components having various functionalities, of which the particular configuration of FIG. 2B is just one. It is contemplated that any of the replaceable keyboard layout structures 230, replaceable keyboard power and connectivity modules 240, or replaceable keyboard height and angle adjustment feet 251 and 252 discussed in embodiments herein with respect to FIG. 2B or other example embodiments may be interchangeable with corresponding components of any of the other embodiments described herein, thus providing for modular components for the keyboard structures. The user-upgradeable modular-component keyboard 220 in an embodiment of FIG. 2B may include a standard form factor replaceable keyboard layout structure 230, a wired or wireless replaceable keyboard power and connectivity module 240 for establishing a wired or wireless connection with an information handling system, and replaceable keyboard height and angle adjustment feet 251 and 252 of any number of heights and angles.

In an embodiment, the replaceable keyboard power and connectivity module 240 may be operatively coupled to the standard form factor replaceable keyboard layout structure 230 via a plurality of releasable module fasteners and via a key switch data connector. The plurality of releasable module fasteners in an embodiment may comprise two sides, each. For example, a right releasable module fastener may comprise a first side or keyboard side (not shown) situated in the bottom surface of the standard form factor replaceable keyboard layout structure 230, as described in greater detail below with respect to FIG. 2D, and a second side, or module side 245 situated on the top surface of the replaceable keyboard power and connectivity module 240. As another example, a left releasable module fastener may comprise a first side or keyboard side (not shown) situated in the bottom surface of the standard form factor replaceable keyboard layout structure 230, as described in greater detail below with respect to FIG. 2D, and a second side, or module side 244 of the releasable module fastener situated on the top surface of the replaceable keyboard power and connectivity module 240. The releasable module fasteners, including the module sides 244 and 245 in an embodiment may comprise, for example, magnets, screws, sliding latches, hooks, posts, or any other type of fastener used in the art. In a specific example, the second sides or module sides 244 and 245 of the releasable module fasteners, may comprise magnets or ferromagnetic plates as shown for magnetic coupling to the first-side or keyboard-side of the releasable module fasteners located on the bottom surface of the standard form factor replaceable keyboard layout structure 230, as described in greater detail with respect to FIG. 2D.

The key switch data connector may have a first side or keyboard side (not shown) situated on the bottom surface of the standard form factor replaceable keyboard layout structure 230, as described in greater detail below with respect to FIG. 2D. In another aspect of an embodiment, the key switch data connector may have a second side or module side 246 situated on the top surface of the replaceable keyboard power and connectivity module 240. The first side or keyboard side and the second side or module side 246 of the key switch data connector may mate in an embodiment upon operative coupling of the first and second sides of the releasable module fasteners, including module sides 244 and 245, as described directly above. In such a way, the replaceable keyboard power and connectivity module 240 in an embodiment may operatively couple with the standard form factor replaceable keyboard layout structure 230, via the key switch data connector, including the module side 246 of the key switch data connector, to allow for the transmission of power and data between the replaceable keyboard power and connectivity module and the standard form factor replaceable keyboard layout structure 230. Each of a plurality of replaceable keyboard power and connectivity modules (e.g., 240) in an embodiment may have various functionalities, including dry cell or rechargeable batteries, keyboard microcontroller, key switch data connector hardware, and wired or wireless communication capabilities.

A plurality of replaceable keyboard height and angle adjustment feet 251 and 252 may be formed in an embodiment, for operative coupling with the standard form factor replaceable keyboard layout structure 230. In an embodiment, each of the replaceable keyboard height and angle adjustment feet 251 and 252 may be operatively coupled to the standard form factor replaceable keyboard layout structure 230 via a plurality of releasable foot fasteners. The plurality of releasable foot fasteners in an embodiment may comprise two sides, each. For example, a right releasable foot fastener may comprise a first side or keyboard side (not shown) situated in the bottom surface of the standard form factor replaceable keyboard layout structure 230, as described in greater detail below with respect to FIG. 2D, and a second side, or foot side 254 situated on the top surface of the right replaceable keyboard height and angle adjustment foot 252. As another example, a left releasable foot fastener may comprise a first side or keyboard side situated in the bottom surface of the standard form factor replaceable keyboard layout structure 230, as described in greater detail below with respect to FIG. 2D, and a second side, or foot side 253 situated on the top surface of the left replaceable keyboard height and angle adjustment foot 251. The releasable foot fasteners, including foot sides 253 and 254 in an embodiment, may comprise magnets, screws, sliding latches, hooks, posts, or any other type of fastener used in the art. In a specific example, the second sides or foot sides 253 and 254 of the releasable foot fasteners, may comprise magnets or a ferromagnetic plate as shown for magnetic coupling to the first-side or keyboard-side of the releasable foot fasteners located on the bottom surface of the standard form factor replaceable keyboard layout structure 230, as described in greater detail with respect to FIG. 2D.

Each of the replaceable keyboard height and angle adjustment feet 251 and 252 in an embodiment may have various heights and tilt angles for tilting a top surface of the replaceable keyboard layout structure according to a user's preference, so long as the height and angle of the replaceable keyboard height and angle adjustment foot 251 match the height and angle of the replaceable keyboard height and angle adjustment foot 252. For example, the replaceable keyboard height and angle adjustment feet 251 and 252 in an embodiment may both have a first foot height 255 and a first foot angle 256.

The standard form factor replaceable keyboard layout structure 230 in an embodiment may be operatively coupled, via releasable foot fasteners including foot sides 253 and 254, to height and angle adjustment feet 251 and 252, respectively, as described in greater detail below with respect to FIG. 2D. For example, in one embodiment, the second sides or foot sides 253 and 254 of the releasable foot fasteners, respectively, may magnetically couple to the first sides or keyboard sides of the releasable foot fasteners located on the bottom surface of the standard form factor replaceable keyboard layout structure 230.

The height and angle adjustment feet 251 and 252 operatively coupled to the standard form factor replaceable keyboard layout structure in such an embodiment may be new or replacement components. For example, a user who wishes to continue to use the standard form factor replaceable keyboard layout structure 230 and the replaceable keyboard power and connectivity module 240, but prefers to change the height or tilt angle of the keyboard may exchange an original set of height and angle adjustment feet (not shown) of a first height and first angle with a new set of height and angle adjustment feet 251 and 252 with a second height, second angle, or both. The user may thus change the height or tilt angle of the user-upgradeable modular-component keyboard without having to replace and dispose of the replaceable keyboard layout structure 230 or the replaceable keyboard power and connectivity module 240. In such a way, assembly of the user-upgradable modular-component keyboard 220 may decrease waste associated with upgrading keyboards.

FIG. 2C is a graphical diagram illustrating a bottom perspective view of a user-upgradeable modular-component keyboard with a wireless replaceable keyboard power and connectivity module according to an embodiment of the present disclosure. The user-upgradeable modular-component keyboard 220 in an embodiment may incorporate a plurality of interchangeable, modular components having various functionalities, of which the particular configuration of FIG. 2C is just one. It is contemplated that any of the replaceable keyboard layout structures 230, replaceable keyboard power and connectivity modules 240, or replaceable keyboard height and angle adjustment feet 251 and 252 discussed herein in an embodiment with respect to FIG. 2C may be interchangeable with corresponding components of any of the other embodiments described herein. The user-upgradeable modular-component keyboard 220 in an embodiment of FIG. 2C may include a standard form factor replaceable keyboard layout structure 230, a wireless replaceable keyboard power and connectivity module 240 for establishing a wireless connection with an information handling system, and replaceable keyboard height and angle adjustment feet 251 and 252 of any number of heights and angles.

A standard form factor replaceable keyboard layout structure 230 may be formed in an example embodiment, for operative coupling of the replaceable keyboard height and angle adjustment feet and a replaceable keyboard power and connectivity module 240 on the bottom surface of the standard form factor replaceable keyboard layout structure 230. The user-upgradeable modular-component keyboard 220 in an embodiment of FIG. 2C may include a wireless replaceable keyboard power and connectivity module 240 for establishing a wireless connection with an information handling system. It is contemplated that various types of wireless replaceable keyboard power and connectivity modules 240 may be formed for interchangeable use with various replaceable keyboard layout structures 230 and various replaceable keyboard height and angle adjustment feet 251 and 252.

As described herein, the replaceable keyboard layout structure 230 in an embodiment may be operatively coupled to one of a plurality of different types of replaceable keyboard power and connectivity modules 240. In various embodiments herein, the replaceable keyboard power and connectivity module 240 may operate as a wired or a wireless in some options for the user-upgradeable modular-component keyboard 220. In embodiments in which the replaceable keyboard power and connectivity module 240 operates as a wired keyboard, such as described above with respect to FIG. 2A, the replaceable keyboard power and connectivity module 240 may include a power and communication port 247 for the transfer of power and data via a wire connecting to the information handling system. The replaceable keyboard power and connectivity module 240 in another embodiment of FIG. 2C may be wireless, and may further include wireless adapters or network interface devices and a keyboard radio for establishing wireless links with the information handling system, as described in greater detail herein. In such an embodiment, the wireless replaceable keyboard power and connectivity module 240 may be powered by and further include a dry cell or rechargeable battery.

Further, various types of wireless replaceable keyboard power and connectivity modules 240 may be available in some embodiments based on the selection of dry cell batteries or rechargeable batteries used therein. A first wireless communication replaceable keyboard power and connectivity module 240 in an embodiment of FIG. 2C may be formed to include a dry cell battery which may be user-replaceable. Such a first wireless communication replaceable keyboard power and connectivity module 240 in an embodiment may also incorporate a wireless adapter and network interface device with a keyboard radio for establishing a wireless link to an information handling system, and have no data communication or power port hardware, as described in greater detail above with respect to FIG. 1. Another option for a wireless communication replaceable keyboard power and connectivity module 240 in an embodiment may be formed to include a rechargeable battery which may be recharged with a power and data port connector on the replaceable keyboard power and connectivity module 240. Such an embodiment may also have a wireless adapter and network interface device with a keyboard radio for establishing a wireless link to an information handling system. The wireless replaceable keyboard power and connectivity module 240 in either embodiment may also incorporate a radio-frequency (RF) transparent window 248 through which wireless links may be established between the wireless adapter of the wireless replaceable keyboard power and connectivity module 240 and a wireless network interface device of an operatively coupled information handling system.

As also described herein, the replaceable keyboard power and connectivity module 240 in an embodiment may be operatively coupled to one of a plurality of different types of replaceable keyboard layout structures 230. In various embodiments herein, the replaceable keyboard layout structure 230 may have a compact form factor or a standard form factor, or may comprise various types of key mechanisms, such as dome, haptic, scissor-type, short stroke, long stroke, quiet keys, or others. In other examples, various replaceable keyboard layout structures 230 may vary in color, backlighting, or material used.

FIG. 2D is a graphical diagram illustrating a bottom perspective view of a plurality of replaceable modular components for operative coupling with a standard form factor keyboard layout structure according to an embodiment of the present disclosure. The user-upgradeable modular-component keyboard 220 in an embodiment may incorporate a plurality of interchangeable, modular components having various functionalities, of which, the particular configuration of FIG. 2D is just one. It is contemplated that any of the replaceable keyboard layout structures 230, replaceable keyboard power and connectivity modules 240, or replaceable keyboard height and angle adjustment feet 251 and 252 discussed herein in an embodiment with respect to FIG. 2D may be interchangeable with corresponding components of any of the other embodiments described herein. The user-upgradeable modular-component keyboard 220 in an embodiment of FIG. 2D may include a standard form factor replaceable keyboard layout structure 230, a wired or wireless replaceable keyboard power and connectivity module 240 for establishing a wireless connection with an information handling system, and replaceable keyboard height and angle adjustment feet 251 and 252 of any number of heights and angles. Other embodiments may include a compact form factor or a standard form factor, or may comprise various types of key mechanisms, such as dome, haptic, scissor-type, short stroke, long stroke, quiet key operation, or other types. In other examples, various replaceable keyboard layout structures 230 may vary in color, backlighting, or material.

In an embodiment, the replaceable keyboard power and connectivity module 240 may be operatively coupled to the any of the replaceable keyboard layout structures of various embodiments herein, via a plurality of releasable module fasteners and via a key switch data connector. The plurality of releasable module fasteners in an embodiment may comprise two sides, each. For example, a right releasable module fastener may comprise a first side or keyboard side 232 situated in the bottom surface of the standard form factor replaceable keyboard layout structure 230, and a second side, or module side (not shown) situated on the top surface of the replaceable keyboard power and connectivity module 240, as described at 245 in FIG. 2B. As another example, a left releasable module fastener may comprise a first side or keyboard side 233 situated in the bottom surface of the standard form factor replaceable keyboard layout structure 230, and a second side, or module side (not shown) situated on the top surface of the replaceable keyboard power and connectivity module 240, as described at 244 in FIG. 2B. The releasable module fasteners, including 232 and 233 in an embodiment may comprise, for example, magnets, screws, sliding latches, hooks, posts, or any other type of fastener used in the art. In a specific example, the first sides or keyboard sides 232 and 233 of the releasable module fasteners, may comprise magnets or a ferromagnetic plate as shown for magnetic coupling to the second-sides or module-sides of the releasable module fasteners located on the top surface of the replaceable keyboard power and connectivity module 240, as described in greater detail with respect to FIG. 2B.

The key switch data connector may have a first side or keyboard side 235 situated on the bottom surface of the standard form factor replaceable keyboard layout structure 230. In another aspect of an embodiment, the key switch data connector may have a second side or module side (not shown) situated on the top surface of the replaceable keyboard power and connectivity module 240, as described at 246 of FIG. 2B. The first side or keyboard side 235 and the second side or module side of the key switch data connector may mate in an embodiment upon operative coupling of the first and second sides of the releasable module fasteners, including module sides 232 and 233, as described directly above. In such a way, the replaceable keyboard power and connectivity module 240 in an embodiment may operatively couple with the standard form factor replaceable keyboard layout structure 230, via the key switch data connector, including the keyboard side 235 of the key switch data connector, to allow for the transmission of power and data between the replaceable keyboard power and connectivity module and the standard form factor replaceable keyboard layout structure 230.

A plurality of replaceable keyboard height and angle adjustment feet 251 and 252 may be formed in an embodiment, for operative coupling with the standard form factor replaceable keyboard layout structure 230. In an embodiment, each of the replaceable keyboard height and angle adjustment feet 251 and 252 may be operatively coupled to the standard form factor replaceable keyboard layout structure 230 via a plurality of releasable foot fasteners. The plurality of releasable foot fasteners in an embodiment may comprise two sides, each. For example, a right releasable foot fastener may comprise a first side or keyboard side 231 situated in the bottom surface of the standard form factor replaceable keyboard layout structure 230, and a second side, or foot side situated on the top surface of the right replaceable keyboard height and angle adjustment foot 252, as shown at 252 in FIG. 2B. As another example, a left releasable foot fastener may comprise a first side or keyboard side 234 situated in the bottom surface of the standard form factor replaceable keyboard layout structure 230, and a second side, or foot side situated on the top surface of the left replaceable keyboard height and angle adjustment foot 251, as shown at 253 in FIG. 2B. The releasable foot fasteners, including 231 and 234 in an embodiment may comprise, for example, magnets, screws, sliding latches, hooks, posts, or any other type of fastener used in the art. In a specific example, the first sides or keyboard sides 231 and 234 of the releasable foot fasteners, may comprise magnets for magnetic coupling to the second-sides or foot-sides of the releasable foot fasteners located on the top surfaces of the replaceable keyboard height and angle adjustment feet 251 and 252, as described in greater detail with respect to FIG. 2B.

The height and angle adjustment feet 251 and 252 operatively coupled to the standard form factor replaceable keyboard layout structure 230 in such an embodiment may be new or replacement components. For example, a user who wishes to continue to use the standard form factor replaceable keyboard layout structure 230 and the replaceable keyboard power and connectivity module 240, but prefers to change the height or tilt angle of the keyboard may exchange an original set of height and angle adjustment feet (not shown) of a first height and first angle with a new set of height and angle adjustment feet 251 and 252 with a second height, second angle, or both. The user may thus change the height or tilt angle of the user-upgradeable modular-component keyboard without having to replace and dispose of the replaceable keyboard layout structure 230 or the replaceable keyboard power and connectivity module 240. In such a way, assembly of the user-upgradable modular-component keyboard 220 may decrease waste associated with upgrading keyboards.

Figure 3A:
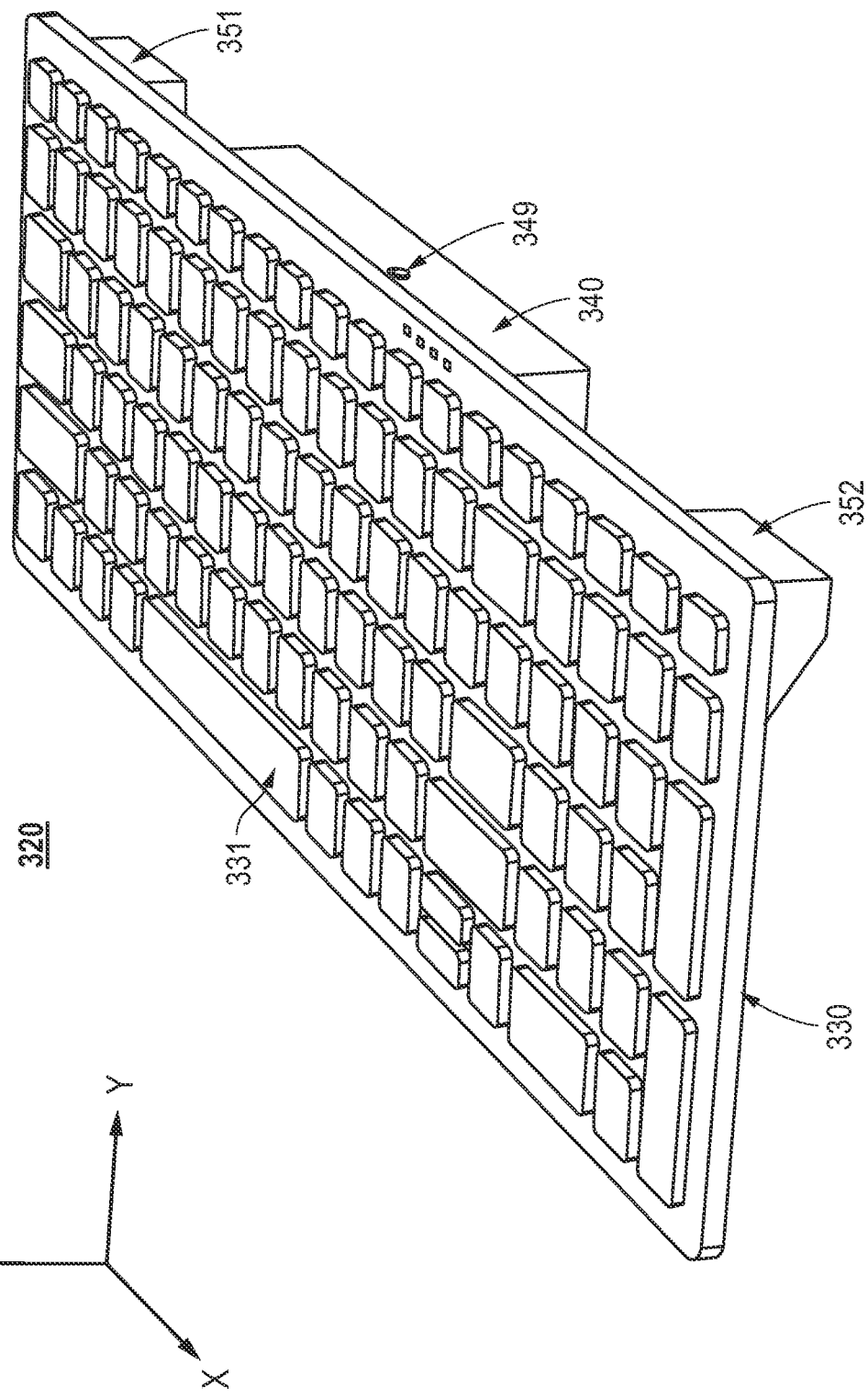
FIG. 3A is a graphical diagram illustrating a top perspective view of a compact form factor user-upgradeable modular-component keyboard according to an embodiment of the present disclosure.

FIG. 3A is a graphical diagram illustrating a top perspective view of a user-upgradeable modular-component keyboard with a compact form factor replaceable keyboard layout structure according to an embodiment of the present disclosure. The user-upgradeable modular-component keyboard 320 in an embodiment may incorporate a plurality of interchangeable, modular components having various functionalities, of which, the particular configuration of FIG. 3A is just one. It is contemplated that any of the replaceable keyboard layout structures 330, replaceable keyboard power and connectivity modules 340, or replaceable keyboard height and angle adjustment feet 351 and 352 discussed herein in an embodiment with respect to FIG. 3A may be interchangeable with corresponding components of any of the other embodiments described herein. The user-upgradeable modular-component keyboard 320 in an embodiment of FIG. 3A may include a compact form factor replaceable keyboard layout structure 330, a wireless replaceable keyboard power and connectivity module 340 for establishing a wireless connection with an information handling system, and replaceable keyboard height and angle adjustment feet 351 and 352 of a second height and a second angle.

A compact form factor replaceable keyboard layout structure 330 may be formed in an embodiment, with a plurality of keys 331. In various embodiments described herein, a compact form factor replaceable keyboard layout structure 330 may differ from a standard form factor in that the standard form factor includes a wider keyboard layout that separates the number keys from the letter keys in accordance with traditional typewriter keyboards, whereas the compact form factor removes or minimizes space unoccupied by keys 331. In various other embodiments herein, the replaceable keyboard layout structure 330 may take a standard form factor, or may comprise various types of key mechanisms, such as dome, haptic, scissor-type, short stroke, long stroke, quiet key, or other key types. In other examples, various replaceable keyboard layout structures 330 may vary in color, lighting, or material.

The compact form factor replaceable keyboard layout structure 330 may be operatively coupled to a replaceable keyboard power and connectivity module 340 and replaceable keyboard height and angle adjustment feet 351 and 352. The compact form factor replaceable keyboard layout structure 330 shown in an embodiment may be a new or replacement component. For example, a user who wishes to continue to use the replaceable keyboard power and connectivity module 340 and the replaceable height and angle adjustment feet 351 and 352, but would like to upgrade, replace, or adjust the form factor of the replaceable keyboard layout structure 330. For example, the user may choose to add the new or upgraded compact form factor replaceable keyboard layout structure 330 in exchange for a standard form factor replaceable keyboard layout structure 230 of FIG. 2A, or to replace a previous compact form factor replaceable keyboard layout structure. Other optional replaceable keyboard layout structure types described above are contemplated as replaceable as well. The user in such a case may make such an exchange without having to replace and dispose of the replaceable keyboard power and connectivity module 340 or the replaceable keyboard height and angle adjustment feet 351 and 352. In such a way, assembly of the user-upgradable modular-component keyboard 320 may decrease waste associated with upgrading keyboards.

As described herein, the compact form factor replaceable keyboard layout structure 330 in an embodiment may be operatively coupled to one of a plurality of different types of replaceable keyboard power and connectivity modules 340. In various embodiments herein, the replaceable keyboard power and connectivity module 340 may operate as a wired or a wireless user-upgradeable modular-component keyboard 320. In embodiments in which the replaceable keyboard power and connectivity module 340 operates as a wired keyboard, the replaceable keyboard power and connectivity module 340 may include a power and communication port for the transfer of power and data via a wire connecting to the information handling system, as described at 247 of FIG. 2A. The replaceable keyboard power and connectivity module 340 shown in FIG. 3A may be wireless, and may further include wireless adapters or network interface devices and a keyboard radio for establishing wireless links with the information handling system. In such an embodiment, the wireless replaceable keyboard power and connectivity module 340 may be powered by and further include a dry cell or rechargeable battery.

A wireless communication replaceable keyboard power and connectivity module 340 incorporating a wireless adapter and network interface device for establishing a wireless link to an information handling system may be formed in an embodiment. It is contemplated that various types of wireless replaceable keyboard power and connectivity modules 340 may be formed for interchangeable use with various replaceable keyboard layout structures 330 and various replaceable keyboard height and angle adjustment feet 351 and 352. For example, wireless replaceable keyboard power and connectivity modules 340 may vary from one another in an embodiment based on the use of dry cell batteries or rechargeable batteries. A first wireless communication replaceable keyboard power and connectivity module 240, including a user-replaceable dry cell battery is described in greater detail above with respect to FIG. 2C. A second wireless communication replaceable keyboard power and connectivity module 340 in an embodiment at FIG. 3A may be formed to include a rechargeable battery. Either wireless communication replaceable keyboard power and connectivity module 340 in an embodiment may also incorporate a wireless adapter and network interface device for establishing a wireless link to an information handling system, as described in greater detail above with respect to FIG. 1. The second wireless replaceable keyboard power and connectivity module 340 in an embodiment may also incorporate power connector 349 for delivering direct current (DC) power from a wall outlet or the information handling system to the rechargeable battery. Power connector 349 may also include a data connector in some embodiments such as a USB connector.

The replaceable keyboard power and connectivity module 340 operatively coupled to the compact form factor replaceable keyboard layout structure 330 in such an embodiment may be a new or replacement component. For example, a user who wishes to continue to use the compact form factor replaceable keyboard layout structure 330 and the replaceable height and angle adjustment feet 351 and 352, but would like to upgrade, replace, or adjust functionality of the replaceable keyboard power and connectivity module 340 may exchange the wireless replaceable keyboard power and connectivity module 340 for a wired replaceable keyboard power and connectivity module 240 of FIG. 2B, a new or upgraded wired replaceable keyboard power and connectivity module, or a wired or wireless replaceable keyboard power and connectivity module having a different type of power source, such as a dry cell battery rather than a rechargeable battery, or vice versa. The user in such a case may make such an exchange without having to replace and dispose of the replaceable keyboard layout structure 330 or the replaceable keyboard height and angle adjustment feet 351 and 352. In such a way, assembly of the user-upgradable modular-component keyboard 320 may decrease waste associated with upgrading keyboards.

FIG. 3B is a graphical diagram illustrating an exploded top perspective view of a compact form factor user-upgradeable modular-component keyboard with a plurality of replaceable modular components according to an embodiment of the present disclosure. The user-upgradeable modular-component keyboard 320 in an embodiment may incorporate a plurality of interchangeable, modular components having various functionalities, of which, the particular configuration of FIG. 3B is just one. It is contemplated that any of the replaceable keyboard height and angle adjustment feet 351 and 352, replaceable keyboard layout structures 330, or replaceable keyboard power and connectivity modules 340 discussed in the embodiment with respect to FIG. 3B may be interchangeable with corresponding components of any of the other embodiments described herein. The user-upgradeable modular-component keyboard 320 in an embodiment of FIG. 3B may include a compact form factor replaceable keyboard layout structure 330, a wired or wireless replaceable keyboard power and connectivity module 340 for establishing a wired or wireless connection with an information handling system, and replaceable keyboard height and angle adjustment feet 351 and 352 of a second height and a second angle.

In an embodiment, the replaceable keyboard power and connectivity module 340 may be operatively coupled to the compact form factor replaceable keyboard layout structure 330 via a plurality of releasable module fasteners and via a key switch data connector. The plurality of releasable module fasteners in an embodiment may comprise two sides, each. For example, a right releasable module fastener may comprise a first side or keyboard side (not shown) situated in the bottom surface of the compact form factor replaceable keyboard layout structure 330, as described in greater detail below with respect to FIG. 3C or any other replaceable keyboard layout structures 320 of embodiments herein, and a second side, or module side 345 situated on the top surface of the replaceable keyboard power and connectivity module 340. As another example, a left releasable module fastener may comprise a first side or keyboard side (not shown) situated in the bottom surface of the compact form factor replaceable keyboard layout structure 330, as described in greater detail below with respect to FIG. 3C or any other replaceable keyboard layout structures of various embodiments described herein, and a second side, or module side 344 situated on the top surface of the replaceable keyboard power and connectivity module 340. The releasable module fasteners, including 344 and 345 in an embodiment may comprise, for example, magnets, screws, sliding latches, hooks, posts, or any other type of fastener used in the art. In a specific example, the second sides or module sides 344 and 345 of the releasable module fasteners, may comprise magnets or ferromagnetic plates (either as shown) for magnetic coupling to the first-side or keyboard-side of the releasable module fasteners located on the bottom surface of the compact form factor replaceable keyboard layout structure 330, as described in greater detail with respect to FIG. 3C, or any other replaceable keyboard layout structures of various embodiments described herein, making them modularly interchangeable. Thus, limited or no tools are necessary to replace or upgrade the components of the modular-component keyboard 320.

The key switch data connector may have a first side or keyboard side (not shown) situated on the bottom surface of the compact form factor replaceable keyboard layout structure 330, as described in greater detail below with respect to FIG. 3C or any other replaceable keyboard layout structures of various embodiments described herein, making them modularly interchangeable. In another aspect of an embodiment, the key switch data connector may have a second side or module side 346 situated on the top surface of the replaceable keyboard power and connectivity module 340. The first side or keyboard side and the second side or module side 346 of the key switch data connector may mate in an embodiment upon operative coupling of the first and second sides of the releasable module fasteners, including 344 and 345, as described directly above. In such a way, the replaceable keyboard power and connectivity module 340 in an embodiment may operatively couple with the compact form factor replaceable keyboard layout structure 330, via the key switch data connector, including the module side 346 of the key switch data connector, to allow for the transmission of power and data between the replaceable keyboard power and connectivity module and the compact form factor replaceable keyboard layout structure 330.

A plurality of replaceable keyboard height and angle adjustment feet 351 and 352 may be formed in an embodiment, for operative coupling with the compact form factor replaceable keyboard layout structure 330. In an embodiment, each of the replaceable keyboard height and angle adjustment feet 351 and 352 may be operatively coupled to the compact form factor replaceable keyboard layout structure 330 via a plurality of releasable foot fasteners. The plurality of releasable foot fasteners in an embodiment may comprise two sides, each. For example, a right releasable foot fastener may comprise a first side or keyboard side (not shown) situated in the bottom surface of the compact form factor replaceable keyboard layout structure 330, as described in greater detail below with respect to FIG. 3C, and a second side, or foot side 354 situated on the top surface of the right replaceable keyboard height and angle adjustment foot 352. As another example, a left releasable foot fastener may comprise a first side or keyboard side situated in the bottom surface of the compact form factor replaceable keyboard layout structure 330, as described in greater detail below with respect to FIG. 3C, and a second side, or foot side 353 situated on the top surface of the left replaceable keyboard height and angle adjustment foot 351. The releasable foot fasteners, including 353 and 354 in an embodiment may comprise, for example, magnets, screws, sliding latches, hooks, posts, or any other type of fastener used in the art. In a specific example, the second sides or foot sides 353 and 354 of the releasable foot fasteners, may comprise magnets for magnetic coupling to the first-side or keyboard-side of the releasable foot fasteners located on the bottom surface of the compact form factor replaceable keyboard layout structure 330, as described in greater detail with respect to FIG. 3C or any other replaceable keyboard layout structures of various embodiments described herein, making them modularly interchangeable.

Each of the replaceable keyboard height and angle adjustment feet 351 and 352 in an embodiment may have various heights and tilt angles for tilting a top surface of the replaceable keyboard layout structure according to a user's preference, so long as the height and angle of the replaceable keyboard height and angle adjustment foot 351 match the height and angle of the replaceable keyboard height and angle adjustment foot 352. For example, the replaceable keyboard height and angle adjustment feet 351 and 352 in an embodiment may both have a second foot height 355 and a second foot angle 356 that differ from the first foot height 255 and first foot angle 256 of FIG. 2B.

The height and angle adjustment feet 351 and 352 operatively coupled to the compact form factor replaceable keyboard layout structure 330 in such an embodiment may be new or replacement components. For example, a user who wishes to continue to use the compact form factor replaceable keyboard layout structure 330 and the replaceable keyboard power and connectivity module 340, but prefers to change the height or tilt angle of the keyboard may exchange an original set of height and angle adjustment feet 251 and 252 of FIG. 2B of a first height 255 and first angle 256 with a new set of height and angle adjustment feet 351 and 352 with a second height 355, second angle 356, or both. The user may thus change the height or tilt angle of the user-upgradeable modular-component keyboard without having to replace and dispose of the replaceable keyboard layout structure 330 or the replaceable keyboard power and connectivity module 340. In such a way, assembly of the user-upgradable modular-component keyboard 320 may decrease waste associated with upgrading keyboards.

FIG. 3C is a graphical diagram illustrating a bottom perspective view of a plurality of replaceable modular components for operative coupling with a compact form factor keyboard layout structure according to an embodiment of the present disclosure. The user-upgradeable modular-component keyboard 320 in an embodiment may incorporate a plurality of interchangeable, modular components having various functionalities, of which, the particular configuration of FIG. 3C is just one. It is contemplated that any of the replaceable keyboard power and connectivity modules 340, replaceable keyboard layout structures 330, or replaceable keyboard height and angle adjustment feet 351 and 352 discussed herein in an embodiment with respect to FIG. 3C may be interchangeable with corresponding components of any of the other embodiments described herein. The user-upgradeable modular-component keyboard 320 in an embodiment of FIG. 3C may include a compact form factor replaceable keyboard layout structure 330, a wired or wireless replaceable keyboard power and connectivity module 340 for establishing a wired or wireless connection with an information handling system, and replaceable keyboard height and angle adjustment feet 351 and 352 of any number of heights and angles.

In an embodiment, the replaceable keyboard power and connectivity module 340 may be operatively coupled to the compact form factor replaceable keyboard layout structure 330 via a plurality of releasable module fasteners and via a key switch data connector. The plurality of releasable module fasteners in an embodiment may comprise two sides, each. For example, a right releasable module fastener may comprise a first side or keyboard side 332 situated in the bottom surface of the compact form factor replaceable keyboard layout structure 330, and a second side, or module side (not shown) situated on the top surface of the replaceable keyboard power and connectivity module 340, as described at 345 in FIG. 3B. As another example, a left releasable module fastener may comprise a first side or keyboard side 333 situated in the bottom surface of the compact form factor replaceable keyboard layout structure 330, and a second side, or module side (not shown) situated on the top surface of the replaceable keyboard power and connectivity module 340, as described at 344 in FIG. 3B. The releasable module fasteners, including sides 332 and 333 in an embodiment may comprise, for example, magnets, screws, sliding latches, hooks, posts, or any other type of fastener used in the art. In a specific example, the first sides or keyboard sides 332 and 333 of the releasable module fasteners, may comprise, as shown, magnets or ferromagnetic plates for magnetic coupling to the second-sides or module-sides of the releasable module fasteners located on the top surface of the replaceable keyboard power and connectivity module 340, as described in greater detail with respect to FIG. 3B or any other replaceable keyboard power and connectivity modules of various embodiments described herein, making them modularly interchangeable. Thus, limited or no tools are necessary to replace or upgrade the components of the modular-component keyboard 320.

The key switch data connector may have a first side or keyboard side 335 situated on the bottom surface of the compact form factor replaceable keyboard layout structure 330. In another aspect of an embodiment, the key switch data connector may have a second side or module side (not shown) situated on the top surface of the replaceable keyboard power and connectivity module 340, as described at 346 of FIG. 3B. The first side or keyboard side 335 and the second side or module side of the key switch data connector may mate in an embodiment upon operative coupling of the first and second sides of the releasable module fasteners, including sides 332 and 333, as described directly above. In such a way, the replaceable keyboard power and connectivity module 340 in an embodiment may operatively couple with the compact form factor replaceable keyboard layout structure 330, via the key switch data connector, including the keyboard side 335 of the key switch data connector, to allow for the transmission of power and data between the replaceable keyboard power and connectivity module and the compact form factor replaceable keyboard layout structure 330. Thus, limited or no tools are necessary to replace or upgrade the components of the modular-component keyboard 320.

A plurality of replaceable keyboard height and angle adjustment feet 351 and 352 may be formed in an embodiment, for operative coupling with the compact form factor replaceable keyboard layout structure 330. In an embodiment, each of the replaceable keyboard height and angle adjustment feet 351 and 352 may be operatively coupled to the compact form factor replaceable keyboard layout structure 330 via a plurality of releasable foot fasteners. The plurality of releasable foot fasteners in an embodiment may comprise two sides, each. For example, a right releasable foot fastener may comprise a first side or keyboard side 331 situated in the bottom surface of the compact form factor replaceable keyboard layout structure 330, and a second side, or foot side (not shown) situated on the top surface of the right replaceable keyboard height and angle adjustment foot 352, as shown at 352 in FIG. 3B. As another example, a left releasable foot fastener may comprise a first side or keyboard side 334 situated in the bottom surface of the compact form factor replaceable keyboard layout structure 330, and a second side, or foot side situated on the top surface of the left replaceable keyboard height and angle adjustment foot 351, as shown at 353 in FIG. 3B. The releasable foot fasteners, including 331 and 334 in an embodiment may comprise, for example, magnets, screws, sliding latches, hooks, posts, or any other type of fastener used in the art. In a specific example, the first sides or keyboard sides 331 and 334 of the releasable foot fasteners, may comprise, as shown, magnets or ferromagnetic plates for magnetic coupling to the second-sides or foot-sides of the releasable foot fasteners located on the top surfaces of the replaceable keyboard height and angle adjustment feet 351 and 352, as described in greater detail with respect to FIG. 3B or any other replaceable keyboard height and angle adjustment feet of various embodiments described herein, making them modularly interchangeable. Thus, limited or no tools are necessary to replace or upgrade the components of the modular-component keyboard 320.

The height and angle adjustment feet 351 and 352 operatively coupled to the compact form factor replaceable keyboard layout structure 330 in such an embodiment may be new or replacement components. For example, a user who wishes to continue to use the compact form factor replaceable keyboard layout structure 330 and the replaceable keyboard power and connectivity module 340, but prefers to change the height or tilt angle of the keyboard may exchange an original set of height and angle adjustment feet 251 and 252 of FIG. 2B of a first height 255 and first angle 256 with a new set of height and angle adjustment feet 351 and 352 with a second height 355, second angle 356, or both (as shown in FIG. 3B). The user may thus change the height or tilt angle of the user-upgradeable modular-component keyboard without having to replace and dispose of the replaceable keyboard layout structure 330 or the replaceable keyboard power and connectivity module 340. In such a way, assembly of the user-upgradable modular-component keyboard 320 may decrease waste associated with upgrading keyboards.

FIG. 4 is a flow diagram illustrating a method of forming a plurality of replaceable, interchangeable, and modular components for a user-upgradeable modular-component keyboard according to an embodiment of the present disclosure. As described herein, the user-upgradeable modular-component keyboard in an embodiment may provide a plurality of interchangeable modular-components that may be combined in a plurality of ways to provide various power and connectivity functionalities and aesthetics. Each of these various components in embodiments of the present disclosure may be mixed and matched with easy replacement, due to the universality of the fasteners for connecting each of these components.

At block 402, a standard form factor replaceable keyboard layout structure or other first type of replaceable keyboard layout structure may be formed in an embodiment, with a side or portion of a key switch data connector, sides or portions of releasable module fasteners, and sides or portions of a plurality of releasable foot fasteners. For example, in an embodiment described with reference to FIG. 2A, a standard form factor replaceable keyboard layout structure 230 may be formed, with a plurality of keys 231. In various embodiments described herein, a standard form factor replaceable keyboard layout structure 230 may differ from a compact form factor in that the standard form factor includes a wider keyboard layout that separates the number keys from the letter keys in accordance with traditional typewriter keyboards. In various other embodiments herein, the replaceable keyboard layout structure 330 may take a standard form factor, or may comprise various types of key mechanisms, such as dome, haptic, scissor-type, short stroke, long stroke, quiet key types, or other types of keys. In other examples, various replaceable keyboard layout structures 330 may vary in color, backlighting, or material. In another example embodiment described with respect to FIG. 2C, a standard form factor replaceable keyboard layout structure 230 or other first type of replaceable keyboard layout structure may be formed for operative coupling with the replaceable keyboard height and angle adjustment feet 251 and 252 and a replaceable keyboard power and connectivity module 240.

In still another example embodiment described with respect to FIGS. 2B and 2D, the standard form factor replaceable keyboard layout structure 230 may include a first side or keyboard side 232 of a right releasable module fastener situated in the bottom surface of the standard form factor replaceable keyboard layout structure 230, for operative coupling of the replaceable keyboard power and connectivity module 240 and the standard form factor replaceable keyboard layout structure 230 or other first type of replaceable keyboard layout structure. The right releasable module fastener in such an embodiment may further include a second side, or module side 245 situated on the top surface of the replaceable keyboard power and connectivity module 240 situated in the bottom surface of the standard form factor replaceable keyboard layout structure 230 or other first type of replaceable keyboard layout structure. In another example, the standard form factor replaceable keyboard layout structure 230 or other first type of replaceable keyboard layout structure may include a first side or keyboard side 233 of a left releasable module fastener situated in the bottom surface of the standard form factor replaceable keyboard layout structure 230 or other first type of replaceable keyboard layout structure, for operative coupling of the replaceable keyboard power and connectivity module 240 and the standard form factor replaceable keyboard layout structure 230 or other first type of replaceable keyboard layout structure. The left releasable module fastener in such an embodiment may further include a second side, or module side 244 situated on the top surface of the replaceable keyboard power and connectivity module 240. The releasable module fasteners, including 232, 233, 244 and 245 in an embodiment may comprise, for example, magnets, screws, sliding latches, hooks, posts, or any other type of fastener used in the art. In a specific example, the first sides or keyboard sides 232 and 233 of the releasable module fasteners located on the bottom surface of the standard form factor replaceable keyboard layout structure 230 or other first type of replaceable keyboard layout structure, may comprise magnets or ferromagnetic plates for magnetic coupling to the second-sides or module-sides 244 and 245 of the releasable module fasteners located on the top surface of the replaceable keyboard power and connectivity module 240.

The standard form factor replaceable keyboard layout structure 230 or other first type of replaceable keyboard layout structure in an embodiment may also include a portion of a key switch data connector for operative coupling with the standard form factor replaceable keyboard layout structure 230. The key switch data connector may have a first side or keyboard side 235 situated on the bottom surface of the standard form factor replaceable keyboard layout structure 230. In another aspect of an embodiment, the key switch data connector may have a second side or module side 246 situated on the top surface of the replaceable keyboard power and connectivity module 240.

In another example embodiment, the standard form factor replaceable keyboard layout structure 230 or other first type of replaceable keyboard layout structure may include a first side or keyboard side 231 of a right releasable foot fastener situated in the bottom surface of the standard form factor replaceable keyboard layout structure 230, for operative coupling of a right replaceable keyboard height and angle adjustment foot 252 and the standard form factor replaceable keyboard layout structure 230. The right releasable foot fastener in such an embodiment may further include a second side, or foot side 254 situated on the top surface of the right replaceable keyboard height and angle adjustment foot 252 situated in the bottom surface of the standard form factor replaceable keyboard layout structure 230 or other first type of replaceable keyboard layout structure. The standard form factor replaceable keyboard layout structure 230 or other first type of replaceable keyboard layout structure in embodiments may also include a first side or keyboard side 234 of a left releasable foot fastener situated in the bottom surface of the standard form factor replaceable keyboard layout structure 230, for operative coupling of a left replaceable keyboard height and angle adjustment foot 251 and the standard form factor replaceable keyboard layout structure 230 or other first type of replaceable keyboard layout structure. The left releasable foot fastener in such an embodiment may further include a second side, or foot side 253 situated on the top surface of the left replaceable keyboard height and angle adjustment foot 251 situated in the bottom surface of the standard form factor replaceable keyboard layout structure 230 or other first type of replaceable keyboard layout structure. The releasable foot fasteners, including 231 and 234 in an embodiment may comprise, for example, magnets, screws, sliding latches, hooks, posts, or any other type of fastener used in the art. In a specific example, the first sides or keyboard sides 231 and 234 of the releasable foot fasteners, may comprise magnets or ferromagnetic plates for magnetic coupling to the second-sides or foot-sides 254 and 253, respectively, of the releasable foot fasteners located on the top surfaces of the replaceable keyboard height and angle adjustment feet 251 and 252. Thus, limited or no tools are necessary to replace or upgrade the components of the modular-component keyboard 220.

In an embodiment at block 404, a compact form factor replaceable keyboard layout structure or other second type of replaceable keyboard layout structure may be formed, with a side or portion of a key switch data connector, sides or portions of releasable module fasteners, and side or portions of a plurality of releasable foot fasteners. For example, in an embodiment described with respect to FIG. 3A, a compact form factor replaceable keyboard layout structure 330 or other second type of replaceable keyboard layout structure may be formed with a plurality of keys 331. In various embodiments described herein, a compact form factor replaceable keyboard layout structure 330 may differ from a standard form factor in that the standard form factor includes a wider keyboard layout that separates the number keys from the letter keys in accordance with traditional typewriter keyboards, whereas the compact form factor removes or minimizes space unoccupied by keys 331. In various other embodiments herein, the replaceable keyboard layout structure 330 may take a standard form factor, or may comprise various types of key mechanisms, such as dome, haptic, scissor-type, short stroke, long stroke, quiet keys, or other key types. In other examples, various replaceable keyboard layout structures 330 may vary in color, backlighting, or material.

In still another example embodiment described with respect to FIGS. 3B and 3C, the compact form factor replaceable keyboard layout structure 330 or other second type of replaceable keyboard layout structure may include a first side or keyboard side 332 of a right releasable module fastener situated in the bottom surface of the compact form factor replaceable keyboard layout structure 330 or other second type of replaceable keyboard layout structure, for operative coupling of the replaceable keyboard power and connectivity module 340 and the compact form factor replaceable keyboard layout structure 330 or other second type of replaceable keyboard layout structure. The right releasable module fastener in such an embodiment may further include a second side, or module side 345 situated on the top surface of the replaceable keyboard power and connectivity module 340 situated in the bottom surface of the compact form factor replaceable keyboard layout structure 330 or other second type of replaceable keyboard layout structure. In another example, the compact form factor replaceable keyboard layout structure 330 or other second type of replaceable keyboard layout structure may include a first side or keyboard side 333 of a left releasable module fastener situated in the bottom surface of the compact form factor replaceable keyboard layout structure 330 or other second type of replaceable keyboard layout structure, for operative coupling of the replaceable keyboard power and connectivity module 340 and the compact form factor replaceable keyboard layout structure 330 or other second type of replaceable keyboard layout structure. The left releasable module fastener in such an embodiment may further include a second side, or module side 344 situated on the top surface of the replaceable keyboard power and connectivity module 340. The releasable module fasteners, including 332, 333, 344 and 345 in an embodiment may comprise, for example, magnets, screws, sliding latches, hooks, posts, or any other type of fastener used in the art. In a specific example, the first sides or keyboard sides 332 and 333 of the releasable module fasteners located on the bottom surface of the compact form factor replaceable keyboard layout structure 330 or other second type of replaceable keyboard layout structure, may comprise magnets or ferromagnetic plates for magnetic coupling to the second-sides or module-sides 344 and 345 of the releasable module fasteners located on the top surface of the replaceable keyboard power and connectivity module 340.

The compact form factor replaceable keyboard layout structure 330 or other second type of replaceable keyboard layout structure in an embodiment may also include a portion of a key switch data connector for operative coupling with the compact form factor replaceable keyboard layout structure 330 or other second type of replaceable keyboard layout structure. The key switch data connector may have a first side or keyboard side 335 situated on the bottom surface of the compact form factor replaceable keyboard layout structure 330 or other second type of replaceable keyboard layout structure. In another aspect of an embodiment, the key switch data connector may have a second side or module side 346 situated on the top surface of the replaceable keyboard power and connectivity module 340.

In another example embodiment, the compact form factor replaceable keyboard layout structure 330 or other second type of replaceable keyboard layout structure may include a first side or keyboard side 331 of a right releasable foot fastener situated in the bottom surface of the compact form factor replaceable keyboard layout structure 330 or other second type of replaceable keyboard layout structure, for operative coupling of a right replaceable keyboard height and angle adjustment foot 352 and the compact form factor replaceable keyboard layout structure 330 or other second type of replaceable keyboard layout structure. The right releasable foot fastener in such an embodiment may further include a second side, or foot side 354 situated on the top surface of the right replaceable keyboard height and angle adjustment foot 352 situated in the bottom surface of the compact form factor replaceable keyboard layout structure 330 or other second type of replaceable keyboard layout structure. The compact form factor replaceable keyboard layout structure 330 or other second type of replaceable keyboard layout structure in embodiments may also include a first side or keyboard side 334 of a left releasable foot fastener situated in the bottom surface of the compact form factor replaceable keyboard layout structure 330 or other second type of replaceable keyboard layout structure, for operative coupling of a left replaceable keyboard height and angle adjustment foot 351 and the compact form factor replaceable keyboard layout structure 330 or other second type of replaceable keyboard layout structure. The left releasable foot fastener in such an embodiment may further include a second side, or foot side 353 situated on the top surface of the left replaceable keyboard height and angle adjustment foot 351 situated in the bottom surface of the compact form factor replaceable keyboard layout structure 330 or other second type of replaceable keyboard layout structure. The releasable foot fasteners, including 331 and 334 in an embodiment may comprise, for example, magnets, screws, sliding latches, hooks, posts, or any other type of fastener used in the art. In a specific example, the first sides or keyboard sides 331 and 334 of the releasable foot fasteners, may comprise magnets or ferromagnetic plates for magnetic coupling to the second-sides or foot-sides 354 and 353, respectively, of the releasable foot fasteners located on the top surfaces of the replaceable keyboard height and angle adjustment feet 351 and 352. Thus, limited or no tools are necessary to replace or upgrade the components of the modular-component keyboard 320. At block 406, a wired communication replaceable keyboard power and connectivity module incorporating a network interface device for establishing a wired link to an information handling system may be formed in an embodiment. Such a wired link an embodiment may be established via an information handling system power and communication port of the replaceable keyboard power and connectivity module, which may further include a side or portion of a key switch data connector for receiving direct current (DC) power from the information handling system, and portions of releasable module fasteners. For example, in an embodiment described with reference to FIG. 1, the replaceable keyboard power and connectivity module 140 may operate to establish a wired link with the information handling system 100 to communicate such information to the hardware processor 101. More specifically, in an embodiment, the replaceable keyboard power and connectivity module 140 may establish a wired link with the information handling system 100, and hardware processor 101 via a Universal Serial Bus C (USB-C) connection, or other type of USB connection. The replaceable keyboard power and connectivity module 140 in an embodiment may receive power to a keyboard controller 142 and a key switch printed circuit board (PCB) backlighting, or other components, via an information handling system power and communication port.

As another example, in an embodiment described with reference to FIG. 2A, a wired communication replaceable keyboard power and connectivity module 240 incorporating a network interface device for establishing a wired link to an information handling system may be formed. Such a wired link an embodiment may be established via an information handling system power and communication port 247 for data communication from the replaceable keyboard power and connectivity module 240, which may further include power connection for receiving direct current (DC) power from the information handling system via the information handling system power and communication port 247.

In other example embodiments described with reference to FIGS. 2B and 2D, the replaceable keyboard power and connectivity module 240 may be formed to include a second side or module side 245 of a right releasable module fastener situated in the top surface of the replaceable keyboard power and connectivity module 240, for operative coupling with the standard form factor replaceable keyboard layout structure 230 or any of the other various types of replaceable keyboard layout structures described herein. The right releasable module fastener in such an embodiment may further include a first side, or keyboard side 232 situated on the bottom surface of the standard form factor replaceable keyboard layout structure 230 or any of the other various types of replaceable keyboard layout structures. In another example, the replaceable keyboard power and connectivity module 240 may include a second side or module side 244 of a left releasable module fastener, for operative coupling of the replaceable keyboard power and connectivity module 240 and the standard form factor replaceable keyboard layout structure 230 or any of the other various types of replaceable keyboard layout structures. The left releasable module fastener in such an embodiment may further include a first side, or keyboard side 233 situated on the bottom surface of the standard form factor replaceable keyboard layout structure 230 or any of the other various types of replaceable keyboard layout structures. The releasable module fasteners, including 232, 233, 244 and 245 in an embodiment may comprise, for example, magnets, screws, sliding latches, hooks, posts, or any other type of fastener used in the art. In a specific example, the first sides or keyboard sides 232 and 233 of the releasable module fasteners located on the bottom surface of the standard form factor replaceable keyboard layout structure 230 or any of the other various types of replaceable keyboard layout structures, may comprise magnets for magnetic coupling to the second-sides or module-sides 244 and 245 of the releasable module fasteners located on the top surface of the replaceable keyboard power and connectivity module 240.

The standard form factor replaceable keyboard layout structure 230 or other various replaceable keyboard layout structures in an embodiment may also include a portion of a key switch data connector for operative coupling with the standard form factor replaceable keyboard layout structure 230. The key switch data connector may have a first side or keyboard side 235 situated on the bottom surface of the standard form factor replaceable keyboard layout structure 230. In another aspect of an embodiment, the key switch data connector may have a second side or module side 246 situated on the top surface of the replaceable keyboard power and connectivity module 240.

In an embodiment at block 408, a first wireless communication replaceable keyboard power and connectivity module may be formed, incorporating a wireless adapter and network interface device for establishing a wireless link to an information handling system. Such a first wireless communication replaceable keyboard power and connectivity module in an embodiment may also include a dry cell battery, a side or portion of a key switch data connector, and sides or portions of releasable module fasteners. For example, in an embodiment described with reference to FIG. 1, the replaceable keyboard power and connectivity module 140 in an embodiment may establish a wireless link with the information handling system 100 via a wireless connection between the keyboard wireless adapter and network interface device 143 and the network interface device 160. More specifically, such a wireless link may be established in accordance with wide personal area network (WPAN) standards, including Bluetooth® technology, or Bluetooth Low Energy (BLE) technology. Keyboard 120 in such an embodiment may be wireless and be powered with a keyboard battery 141 that is a replaceable dry cell battery at block 408.

In another example, in an embodiment described with respect to FIG. 2C, the user-upgradeable modular-component keyboard 220 may include a wireless replaceable keyboard power and connectivity module 240 for establishing a wireless connection with an information handling system. In various embodiments herein, a plurality of wireless replaceable keyboard power and connectivity modules 240 may vary from one another based on the use of dry cell batteries or rechargeable batteries, as discussed below in block 410. A first wireless communication replaceable keyboard power and connectivity module 240 in an embodiment at FIG. 2C may be formed to include a dry cell battery which may be user-replaceable. Such a first wireless communication replaceable keyboard power and connectivity module 240 in an embodiment may also incorporate a wireless adapter and network interface device for establishing a wireless link to an information handling system.

In other example embodiments described with reference to FIGS. 2B and 2D, the replaceable keyboard power and connectivity module 240 may be formed to include a second side or module side 245 of a right releasable module fastener situated in the top surface of the replaceable keyboard power and connectivity module 240, for operative coupling with the standard form factor replaceable keyboard layout structure 230 or any of the other various types of replaceable keyboard layout structures formed in blocks 402 or 404. The right releasable module fastener in such an embodiment may further include a first side, or keyboard side 232 situated on the bottom surface of the standard form factor replaceable keyboard layout structure 230 or any of the other various types of replaceable keyboard layout structures. In another example, the replaceable keyboard power and connectivity module 240 may include a second side or module side 244 of a left releasable module fastener, for operative coupling of the replaceable keyboard power and connectivity module 240 and the standard form factor replaceable keyboard layout structure 230 or any of the other various types of replaceable keyboard layout structures. The left releasable module fastener in such an embodiment may further include a first side, or keyboard side 233 situated on the bottom surface of the standard form factor replaceable keyboard layout structure 230 or any of the other various types of replaceable keyboard layout structures. The releasable module fasteners, including 232, 233, 244 and 245 in an embodiment may comprise, for example, magnets, screws, sliding latches, hooks, posts, or any other type of fastener used in the art. In a specific example, the first sides or keyboard sides 232 and 233 of the releasable module fasteners located on the bottom surface of the standard form factor replaceable keyboard layout structure 230 or any of the other various types of replaceable keyboard layout structures, may comprise magnets or ferromagnetic plates for magnetic coupling to the second-sides or module-sides 244 and 245 of the releasable module fasteners located on the top surface of the replaceable keyboard power and connectivity module 240.

The standard form factor replaceable keyboard layout structure 230 or any of the other various types of replaceable keyboard layout structures in an embodiment may also include a portion of a key switch data connector for operative coupling with the standard form factor replaceable keyboard layout structure 230 or any of the other various types of replaceable keyboard layout structures. The key switch data connector may have a first side or keyboard side 235 situated on the bottom surface of the standard form factor replaceable keyboard layout structure 230 or any of the other various types of replaceable keyboard layout structures. In another aspect of an embodiment, the key switch data connector may have a second side or module side 246 situated on the top surface of the replaceable keyboard power and connectivity module 240.

At block 410, a second wireless communication replaceable keyboard power and connectivity module incorporating a wireless adapter and network interface device for establishing a wireless link to an information handling system may be formed in an embodiment. Such a second wireless communication replaceable keyboard power and connectivity module in an embodiment may also include a side or portion of a key switch data connector, sides or portions of releasable module fasteners, a rechargeable battery and a power connector for receiving direct current (DC) power from the information handling system or an outlet to charge the rechargeable battery or power the keyboard. For example, in an embodiment described with reference to FIG. 1, battery 105 or A/C power adapter 106 may be operatively coupled to the keyboard battery 141 via an electrically conductive wire 199. The user-upgradeable modular component keyboard 121 in an embodiment may include the keyboard battery 141, which may function as a rechargeable battery in the embodiment of block 410.

In another embodiment described with respect to FIG. 3A, a second wireless communication replaceable keyboard power and connectivity module 340 may be formed to include the rechargeable battery. Such a second wireless communication replaceable keyboard power and connectivity module 340 in an embodiment may also incorporate a wireless adapter and network interface device for establishing a wireless link to an information handling system, as described in greater detail above with respect to FIG. 1. The wireless replaceable keyboard power and connectivity module 340 in an embodiment may also incorporate power connector 349 for delivering direct current (DC) power from a wall outlet or the information handling system to the rechargeable battery or to the keyboard.

In other example embodiments described with reference to FIGS. 3B and 3C, the replaceable keyboard power and connectivity module 340 may be formed to include a second side or module side 345 of a right releasable module fastener situated in the top surface of the replaceable keyboard power and connectivity module 340, for operative coupling with the compact form factor replaceable keyboard layout structure 330 or any of the other various types of replaceable keyboard layout structures formed at blocks 402 and 404. The right releasable module fastener in such an embodiment may further include a first side, or keyboard side 332 situated on the bottom surface of the compact form factor replaceable keyboard layout structure 330 or any of the other various types of replaceable keyboard layout structures. In another example, the replaceable keyboard power and connectivity module 340 may include a second side or module side 344 of a left releasable module fastener, for operative coupling of the replaceable keyboard power and connectivity module 340 and the compact form factor replaceable keyboard layout structure 330 or any of the other various types of replaceable keyboard layout structures. The left releasable module fastener in such an embodiment may further include a first side, or keyboard side 333 situated on the bottom surface of the compact form factor replaceable keyboard layout structure 330 or any of the other various types of replaceable keyboard layout structures. The releasable module fasteners, including 332, 333, 344 and 345 in an embodiment may comprise, for example, magnets, screws, sliding latches, hooks, posts, or any other type of fastener used in the art. In a specific example, the first sides or keyboard sides 332 and 333 of the releasable module fasteners located on the bottom surface of the compact form factor replaceable keyboard layout structure 330 or any of the other various types of replaceable keyboard layout structures, may comprise magnets or ferromagnetic plates for magnetic coupling to the second-sides or module-sides 344 and 345 of the releasable module fasteners located on the top surface of the replaceable keyboard power and connectivity module 340.

The compact form factor replaceable keyboard layout structure 330 or any of the other various types of replaceable keyboard layout structures formed at blocks 402 and 404 in an embodiment may also include a portion of a key switch data connector for operative coupling with the standard form factor replaceable keyboard layout structure 330 or any of the other various types of replaceable keyboard layout structures. The key switch data connector may have a first side or keyboard side 335 situated on the bottom surface of the compact form factor replaceable keyboard layout structure 330 or any of the other various types of replaceable keyboard layout structures. In another aspect of an embodiment, the key switch data connector may have a second side or module side 346 situated on the top surface of the replaceable keyboard power and connectivity module 340.

In an embodiment at block 412, a plurality of replaceable keyboard height and angle adjustment feet may be formed with portions of a plurality of releasable foot fasteners, each having various heights and tilt angles for tilting a top surface of the replaceable keyboard layout structure. For example, in embodiments described with reference to FIGS. 2B and 2D, a right replaceable keyboard height and angle adjustment foot 252 in an embodiment may include second side or foot side 254 of a right releasable foot fastener situated on the top surface of the right replaceable keyboard height and angle adjustment foot 252 for operative coupling with the standard form factor replaceable keyboard layout structure 230 or any of the other various types of replaceable keyboard layout structures formed at blocks 402 and 404. The right releasable foot fastener in such an embodiment may further include a first side, or keyboard side 234 situated on the bottom surface of the standard form factor replaceable keyboard structure 230 or any of the other various types of replaceable keyboard layout structures. A left replaceable keyboard height and angle adjustment foot 251 in embodiments may also include a first side or foot side 253 of a left releasable foot fastener situated in the top surface of the left replaceable keyboard height and angle adjustment foot 251, for operative coupling of the left replaceable keyboard height and angle adjustment foot 251 and the standard form factor replaceable keyboard layout structure 230 or any of the other various types of replaceable keyboard layout structures. The left releasable foot fastener in such an embodiment may further include a first side, or keyboard side 233 situated on the bottom surface of the standard form factor replaceable keyboard layout structure 230 or any of the other various types of replaceable keyboard layout structures. The releasable foot fasteners, including 253 and 254 in an embodiment may comprise, for example, magnets, screws, sliding latches, hooks, posts, or any other type of fastener used in the art. In a specific example, the first sides or keyboard sides 231 and 234 of the releasable foot fasteners, may comprise magnets or ferromagnetic plates for magnetic coupling to the second-sides or foot-sides 254 and 253, respectively, of the releasable foot fasteners located on the top surfaces of the replaceable keyboard height and angle adjustment feet 251 and 252.

Each of the replaceable keyboard height and angle adjustment feet 251 and 252 in an embodiment may have various heights and tilt angles for tilting a top surface of the replaceable keyboard layout structure according to a user's preference, so long as the height and angle of the replaceable keyboard height and angle adjustment foot 251 match the height and angle of the replaceable keyboard height and angle adjustment foot 252. For example, the replaceable keyboard height and angle adjustment feet 251 and 252 in an embodiment may both have a first foot height 255 and a first foot angle 256.

In other example embodiments described with respect to FIGS. 3B and 3C, a right replaceable keyboard height and angle adjustment foot 352 in an embodiment may include second side or foot side 354 of a right releasable foot fastener situated on the top surface of the right replaceable keyboard height and angle adjustment foot 352 for operative coupling with the compact form factor replaceable keyboard layout structure 330 or any of the other various types of replaceable keyboard layout structures formed at blocks 402 and 404. The right releasable foot fastener in such an embodiment may further include a first side, or keyboard side 334 situated on the bottom surface of the compact form factor replaceable keyboard structure 330 or any of the other various types of replaceable keyboard layout structures. A left replaceable keyboard height and angle adjustment foot 351 in embodiments may also include a first side or foot side 353 of a left releasable foot fastener situated in the top surface of the left replaceable keyboard height and angle adjustment foot 351, for operative coupling of the left replaceable keyboard height and angle adjustment foot 351 and the compact form factor replaceable keyboard layout structure 330 or any of the other various types of replaceable keyboard layout structures. The left releasable foot fastener in such an embodiment may further include a first side, or keyboard side 333 situated on the bottom surface of the compact form factor replaceable keyboard layout structure 330 or any of the other various types of replaceable keyboard layout structures. The releasable foot fasteners, including 353 and 354 in an embodiment may comprise, for example, magnets, screws, sliding latches, hooks, posts, or any other type of fastener used in the art. In a specific example, the first sides or keyboard sides 331 and 334 of the releasable foot fasteners, may comprise magnets or ferromagnetic plates for magnetic coupling to the second-sides or foot-sides 354 and 353, respectively, of the releasable foot fasteners located on the top surfaces of the replaceable keyboard height and angle adjustment feet 351 and 352. The replaceable keyboard height and angle adjustment feet 351 and 352 in an embodiment may both have a second foot height 355 and a second foot angle 356 that differ from the first foot height 255 and first foot angle 256 of FIG. 2B. In such a way, a plurality of interchangeable, modular components having various functionalities may be formed for assemblage into a user-upgradeable modular-component keyboard. The method for forming a plurality of modular components for a user-upgradeable modular-component keyboard according to an embodiment of the present disclosure may then end.

FIG. 5 is a flow diagram illustrating a method of assembling a plurality of interchangeable, replaceable, and modular components together to form a user-upgradeable modular-component keyboard according to an embodiment of the present disclosure. As described herein, the user-upgradeable modular-component keyboard in an embodiment may allow for assemblage of a plurality of interchangeable modular-components that may be combined in a plurality of ways to provide various power and connectivity functionalities and aesthetics. A user who wishes to continue to use most of the components of a previous user-upgradeable modular-component keyboard, such as the replaceable keyboard layout structure, the replaceable keyboard power and connectivity module, or the replaceable keyboard height and angle adjustment feet, may upgrade, replace, or adjust functionality of any one or more of these components by exchanging the undesirable or broken component with a new or upgraded version of that component. The user in such a case may make such an exchange without having to replace and dispose of the remaining, currently functional components with which the user is satisfied. In such a way, assembly of the user-upgradable modular-component keyboard may decrease waste associated with upgrading or replacing keyboards.

At block 502, one of a plurality of replacement or new replaceable keyboards in an embodiment may be operatively coupled, via a plurality of releasable foot fasteners, to new or replacement replaceable height and angle adjustment feet having a user-selected height and tilt angle for tilting the top surface of the replaceable keyboard layout structure. As described herein at block 412 of FIG. 4, a plurality of replaceable keyboard height and angle adjustment feet of various heights and tilt angles may be formed in an embodiment. As also described herein at blocks 402 and 404, a plurality of replaceable keyboard layout structures having various form factors, including standard and compact, may be formed. In various embodiments herein, the replaceable keyboard layout structure may have a compact form factor or a standard form factor, or may comprise various types of key mechanisms, such as dome, haptic, scissor-type, short stroke, long stroke, quiet key, or other key types. In other examples, various replaceable keyboard layout structures may vary in color, backlighting, or material. These components may be interchangeable with one another in various embodiments described herein, through operative coupling between standardized fasteners of each of these interchangeable components.

For example, in embodiments described with reference to FIGS. 2B and 2D, each of the replaceable keyboard height and angle adjustment feet 251 and 252 may be operatively coupled to the standard form factor replaceable keyboard layout structure 230 or various other types of replaceable keyboard layout structures, via a plurality of releasable foot fasteners. Various replaceable keyboard layout structures in other embodiments may comprise various types of key mechanisms, such as dome, haptic, scissor-type, short stroke, or long stroke, or may vary in color or material. The plurality of releasable foot fasteners in an embodiment may comprise two sides, each. For example, a right releasable foot fastener may comprise a first side or keyboard side 231 situated in the bottom surface of the standard form factor replaceable keyboard layout structure 230 or various other types of replaceable keyboard layout structures, and a second side, or foot side 254 situated on the top surface of the right replaceable keyboard height and angle adjustment foot 252. As another example, a left releasable foot fastener may comprise a first side or keyboard side 234 situated in the bottom surface of the standard form factor replaceable keyboard layout structure 230 or various other types of replaceable keyboard layout structures, and a second side, or foot side 253 situated on the top surface of the left replaceable keyboard height and angle adjustment foot 251. The releasable foot fasteners, including 231, 234, 253 and 254 in an embodiment may comprise, for example, magnets, screws, sliding latches, hooks, posts, or any other type of fastener used in the art. In a specific example, the second sides or foot sides 253 and 254 of the releasable foot fasteners, may comprise magnets or ferromagnetic plates for magnetic coupling to the first-side or keyboard-side 234 and 231, respectively, of the releasable foot fasteners located on the bottom surface of the standard form factor replaceable keyboard layout structure 230 or various other types of replaceable keyboard layout structures.

The height and angle adjustment feet and operatively coupled to any type of replaceable keyboard layout structure in such embodiments may be new or replacement components. For example, in an embodiment described with reference to FIG. 2B, a user who wishes to continue to use the current replaceable keyboard layout structure 230 and the replaceable keyboard power and connectivity module 240, but prefers to change the height or tilt angle of the keyboard may exchange an original set of height and angle adjustment feet (not shown) of a first height and first angle with a new set of height and angle adjustment feet 251 and 252 with a second height, second angle, or both. The user may thus change the height or tilt angle of the user-upgradeable modular-component keyboard without having to replace and dispose of the current replaceable keyboard layout structure 230 or the replaceable keyboard power and connectivity module 240. In such a way, assembly of the user-upgradable modular-component keyboard 220 may decrease waste associated with upgrading keyboards.

In another example embodiment, the replaceable keyboard layout structure that is operatively coupled to the height and angle adjustment feet in such an embodiment may be the new or replaced component. For example, in an embodiment described with reference to FIG. 2A, a user who wishes to continue to use the replaceable keyboard power and connectivity module 240 and the replaceable height and angle adjustment feet 251 and 252, but would like to upgrade, replace, or adjust the type or form factor of the replaceable keyboard layout structure used may exchange a first replaceable keyboard layout structure of any first type for a second replaceable keyboard layout structure that is a new or upgraded type of replaceable keyboard layout structure 230. The user in such a case may make such an exchange without having to replace and dispose of the replaceable keyboard power and connectivity module 240 or the replaceable keyboard height and angle adjustment feet 251 and 252. Thus, limited or no tools are necessary to replace or upgrade the components of the modular-component keyboard 220.

In various embodiments herein, the replaceable keyboard layout structure may have a compact form factor or a standard form factor, or may comprise various types of key mechanisms, such as dome, haptic, scissor-type, short stroke, long stroke, quiet keys, or other key types. In other examples, various replaceable keyboard layout structures may vary in color, backlighting, or material. In another example embodiment described with reference to FIG. 3A, a user who wishes to continue to use the replaceable keyboard power and connectivity module 340 and the replaceable height and angle adjustment feet 351 and 352, but would like to upgrade, replace, or adjust the form factor or type of the replaceable keyboard layout structure 330 may exchange the current, first replaceable keyboard layout structure for a second replaceable keyboard layout structure that is a new or upgraded type of replaceable keyboard layout structure. The user in such a case may make such an exchange without having to replace and dispose of the replaceable keyboard power and connectivity module 340 or the replaceable keyboard height and angle adjustment feet 351 and 352. In such a way, assembly of the user-upgradable modular-component keyboard 320 may decrease waste associated with upgrading keyboards. Thus, limited or no tools are necessary to replace or upgrade the components of the modular-component keyboard 320.

In another example, in embodiments described with reference to FIGS. 3B and 3C, each of the replaceable keyboard height and angle adjustment feet 351 and 352 may be operatively coupled to the compact form factor replaceable keyboard layout structure 330, or other various types of replaceable keyboard layout structures, via a plurality of releasable foot fasteners. Various replaceable keyboard layout structures in other embodiments may comprise various types of key mechanisms, such as dome, haptic, scissor-type, short stroke, or long stroke, or may vary in color or material. The plurality of releasable foot fasteners in an embodiment may comprise two sides, each. For example, a right releasable foot fastener may comprise a first side or keyboard side 331 situated in the bottom surface of the compact form factor replaceable keyboard layout structure 330 or various other types of replaceable keyboard layout structures, and a second side, or foot side 354 situated on the top surface of the right replaceable keyboard height and angle adjustment foot 352. As another example, a left releasable foot fastener may comprise a first side or keyboard side 334 situated in the bottom surface of the compact form factor replaceable keyboard layout structure 330 or various other types of replaceable keyboard layout structures, and a second side, or foot side 353 situated on the top surface of the left replaceable keyboard height and angle adjustment foot 351. The releasable foot fasteners, including 331, 334, 353 and 354 in an embodiment may comprise, for example, magnets, screws, sliding latches, hooks, posts, or any other type of fastener used in the art. In a specific example, the second sides or foot sides 353 and 354 of the releasable foot fasteners, may comprise magnets or ferromagnetic plates for magnetic coupling to the first-side or keyboard-side 334 and 331, respectively, of the releasable foot fasteners located on the bottom surface of the compact form factor replaceable keyboard layout structure 330 or various other types of replaceable keyboard layout structures.

In an embodiment at block 504, one of a plurality of replacement or new replaceable keyboard power and connectivity modules may be operatively coupled, via a key switch data connector, and releasable module fasteners, to the replaceable keyboard to form user-upgradeable modular component keyboard. As described herein at block 406 of FIG. 4, wired replaceable keyboard power and connectivity module for establishing a wired connection with an information handling system may be formed in an embodiment. As also described herein at blocks 408 and 410, a plurality of wireless replaceable keyboard power and connectivity modules for establishing wireless connections with an information handling system may be formed. These wireless replaceable keyboard power and connectivity modules in various embodiments herein may differ from one another by the power source (e.g., dry cell or rechargeable battery) incorporated therein. These components may be interchangeable with one another in various embodiments described herein, through operative coupling between standardized fasteners of each of these interchangeable components.

For example, in an embodiment described with respect to blocks 406 and 408 of FIG. 4 and FIGS. 2B and 2D, the replaceable keyboard power and connectivity module 240 may be operatively coupled to the standard form factor replaceable keyboard layout structure 230 or various other types of replaceable keyboard layout structures via a plurality of releasable module fasteners and via a key switch data connector. The plurality of releasable module fasteners in an embodiment may comprise two sides, each. For example, a right releasable module fastener may comprise a first side or keyboard side 232 situated in the bottom surface of the standard form factor replaceable keyboard layout structure 230 or various other types of replaceable keyboard layout structures, and a second side, or module side 245 situated on the top surface of the replaceable keyboard power and connectivity module 240. As another example, a left releasable module fastener may comprise a first side or keyboard side 233 situated in the bottom surface of the standard form factor replaceable keyboard layout structure 230 or various other types of replaceable keyboard layout structures, and a second side, or module side 244 situated on the top surface of the replaceable keyboard power and connectivity module 240. The releasable module fasteners, including 232 and 233 in an embodiment may comprise, for example, magnets, screws, sliding latches, hooks, posts, or any other type of fastener used in the art. In a specific example, the first sides or keyboard sides 232 and 233 of the releasable module fasteners, may comprise magnets or ferromagnetic plates for magnetic coupling to the second-sides or module-sides 244 and 245 of the releasable module fasteners located on the top surface of the replaceable keyboard power and connectivity module 240.

The key switch data connector may have a first side or keyboard side 235 situated on the bottom surface of the standard form factor replaceable keyboard layout structure 230 or various other types of replaceable keyboard layout structures. In another aspect of an embodiment, the key switch data connector may have a second side or module side 246 situated on the top surface of the replaceable keyboard power and connectivity module 240. The first side or keyboard side 235 and the second side or module side 246 of the key switch data connector may mate in an embodiment upon operative coupling of the first and second sides of the releasable module fasteners, including 244, 245, 232 and 233, as described directly above. In such a way, the replaceable keyboard power and connectivity module 240 in an embodiment may operatively couple with the standard form factor replaceable keyboard layout structure 230 or various other types of replaceable keyboard layout structures, via the key switch data connector, including the keyboard side 235 and the module side 246 of the key switch data connector, to allow for the transmission of power and data between the replaceable keyboard power and connectivity module 240 and the standard form factor replaceable keyboard layout structure 230 or various other types of replaceable keyboard layout structures.

As another example, in an embodiment described with respect to block 410 of FIG. 4 and FIGS. 3B and 3C, the replaceable keyboard power and connectivity module 340 may be operatively coupled to the compact form factor replaceable keyboard layout structure 330 or various other types of replaceable keyboard layout structures via a plurality of releasable module fasteners and via a key switch data connector. The plurality of releasable module fasteners in an embodiment may comprise two sides, each. For example, a right releasable module fastener may comprise a first side or keyboard side 332 situated in the bottom surface of the compact form factor replaceable keyboard layout structure 330 or various other types of replaceable keyboard layout structures, and a second side, or module side 345 situated on the top surface of the replaceable keyboard power and connectivity module 340. As another example, a left releasable module fastener may comprise a first side or keyboard side 333 situated in the bottom surface of the compact form factor replaceable keyboard layout structure 330 or various other types of replaceable keyboard layout structures, and a second side, or module side 344 situated on the top surface of the replaceable keyboard power and connectivity module 340. The releasable module fasteners, including 332 and 333 in an embodiment may comprise, for example, magnets, screws, sliding latches, hooks, posts, or any other type of fastener used in the art. In a specific example, the first sides or keyboard sides 332 and 333 of the releasable module fasteners, may comprise magnets or ferromagnetic plates for magnetic coupling to the second-sides or module-sides 344 and 345 of the releasable module fasteners located on the top surface of the replaceable keyboard power and connectivity module 340.

The key switch data connector may have a first side or keyboard side 335 situated on the bottom surface of the compact form factor replaceable keyboard layout structure 330 or various other types of replaceable keyboard layout structures. In another aspect of an embodiment, the key switch data connector may have a second side or module side 346 situated on the top surface of the replaceable keyboard power and connectivity module 340. The first side or keyboard side 335 and the second side or module side 346 of the key switch data connector may mate in an embodiment upon operative coupling of the first and second sides of the releasable module fasteners, including 344, 345, 332 and 333, as described directly above. In such a way, the replaceable keyboard power and connectivity module 340 in an embodiment may operatively couple with the compact form factor replaceable keyboard layout structure 330 or various other types of replaceable keyboard layout structures, via the key switch data connector, including the keyboard side 335 and the module side 346 of the key switch data connector, to allow for the transmission of power and data between the replaceable keyboard power and connectivity module 340 and the compact form factor replaceable keyboard layout structure 330 or various other types of replaceable keyboard layout structures.

In an embodiment, the replaceable keyboard power and connectivity module operatively coupled to the replaceable keyboard layout structure may be a new or replacement component. For example, in an embodiment described with reference to FIG. 2A, the replaceable keyboard power and connectivity module 240 operatively coupled to the standard form factor replaceable keyboard layout structure 230 shown, or various other types of replaceable keyboard layout structures may be a new or replacement component. A user who wishes to continue to use the standard form factor replaceable keyboard layout structure 230 or various other types of replaceable keyboard layout structures and the replaceable height and angle adjustment feet 251 and 252 shown in FIG. 2A, but would like to upgrade, replace, or adjust functionality of the replaceable keyboard power and connectivity module 240 may exchange the wired replaceable keyboard power and connectivity module 240 for a wireless replaceable keyboard power and connectivity module in one example. In another example, exchange may be for a new or upgraded wired replaceable keyboard power and connectivity module. In yet another embodiment, exchange may be for or a wired or wireless replaceable keyboard power and connectivity module having a different type of power source, such as a dry cell battery rather than a rechargeable battery, or vice versa. The user in any such case may make such an exchange without having to replace and dispose of the current replaceable keyboard layout structure 230 or various other types of replaceable keyboard layout structures or the replaceable keyboard height and angle adjustment feet 251 and 252. Thus, limited or no tools are necessary to replace or upgrade the components of the modular-component keyboard 220. In such a way, assembly of the user-upgradable modular-component keyboard 220 may decrease waste associated with upgrading keyboards.

In another example embodiment described with reference to FIG. 3A, the replaceable keyboard power and connectivity module 340 may be a new or replacement component operatively coupled to the compact form factor replaceable keyboard layout structure 330 or various other types of replaceable keyboard layout structures. For example, a user who wishes to continue to use the current replaceable keyboard layout structure such as the compact form factor replaceable keyboard layout structure 330, or various other types of replaceable keyboard layout structures, and the replaceable height and angle adjustment feet 351 and 352, may upgrade, replace, or adjust functionality of the replaceable keyboard power and connectivity module 340. The user may exchange the wireless replaceable keyboard power and connectivity module 340 for a wired replaceable keyboard power and connectivity module 240 of FIG. 2B, a new or upgraded wired replaceable keyboard power and connectivity module, or a wired or wireless replaceable keyboard power and connectivity module having a different type of power source, such as a dry cell battery rather than a rechargeable battery, or vice versa in various embodiments. The user in such a case may make such an exchange without having to replace and dispose of the replaceable keyboard layout structure 330 or various other types of replaceable keyboard layout structures or the replaceable keyboard height and angle adjustment feet 351 and 352. Thus, limited or no tools are necessary to replace or upgrade the components of the modular-component keyboard 320. In such a way, assembly of the user-upgradable modular-component keyboard 320 may decrease waste associated with upgrading keyboards.

At block 506, it may be determined whether the user-upgradeable modular component keyboard should be operatively coupled to the information handling system via a wired or a wireless connection. As described herein, the replaceable keyboard layout structure in an embodiment may be operatively coupled to one of a plurality of different types of replaceable keyboard power and connectivity modules. In various embodiments herein, the replaceable keyboard power and connectivity module may operate as a wired or a wireless keyboard. In embodiments in which the replaceable keyboard power and connectivity module operates as a wired keyboard, the replaceable keyboard power and connectivity module may include a power and communication port for the transfer of power and data via a wire connecting to the information handling system. In such a way, the wired replaceable keyboard power and connectivity module may establish a wired operative coupling with the information handling system. Other embodiments of the replaceable keyboard power and connectivity module may be wireless, and may further include wireless adapters or network interface devices for establishing wireless links with the information handling system. In such embodiments, the wireless replaceable keyboard power and connectivity module may be powered by and further include a dry cell or rechargeable battery. If the user-upgradeable modular component keyboard should be operatively coupled to the information handling system via a wired connection, the method may proceed to block 508 for operative coupling of the replaceable keyboard power and connectivity module of the user-upgradeable modular component keyboard to the information handling system via a wired connection. If the user-upgradeable modular component keyboard should be operatively coupled to the information handling system via a wireless connection, the method may proceed to block 512 for operative coupling of the replaceable keyboard power and connectivity module of the user-upgradeable modular component keyboard to the information handling system via a wireless connection and to supply battery power to the user-upgradeable modular component keyboard.

In an embodiment at block 508, in which it is determined that the user-upgradeable modular component keyboard should be operatively coupled to the information handling system via a wired data and power connection, the information handling system may be operatively coupled to the replaceable keyboard power and connectivity module via wired connection. For example, in an embodiment described with reference to FIG. 1, battery 105 or A/C power adapter 106 of the information handling system 100 may be operatively coupled to the keyboard battery 141 via an electrically conductive wire if the keyboard 120 is wired. The user-upgradeable modular component keyboard 121 in an embodiment may include a power port connector for receiving power from the A/C power source of the information handling system. As another example, in an embodiment described with reference to FIG. 2A, the information handling system may be operatively coupled to the replaceable wired keyboard power and connectivity module 240, via wired connection through the information handling system power and communication port 247, which may comprise a Universal Serial Bus (USB-C) connection capable of transmitting power and data, for example.

At block 510, power and connectivity may be supplied in an embodiment to the user-upgradeable modular component keyboard from the information handling system via a wired connection. For example, in an embodiment described with reference to FIG. 1, battery 105 or A/C power adapter 106 may be operatively coupled to the keyboard battery 141 via an electrically conductive wire if the keyboard 120 is wired. In an example embodiment described with reference to FIG. 2A, upon operative coupling of the information handling system to the replaceable keyboard power and connectivity module, power may be supplied, and data transferred to the user-upgradeable modular component keyboard 220 from the information handling system via a wired connection (e.g., USB-C) through the information handling system power and communication port 247. In such a way, a user-upgradeable modular component keyboard capable of wired connection to an information handling system may be assembled using interchangeable, replaceable, modular components. The method for assembling a plurality of interchangeable, replaceable, and modular components together to form a user-upgradeable modular-component keyboard may then end.

In an embodiment at block 512 in which it is determined that the user-upgradeable modular component keyboard should be operatively coupled to the information handling system via a wireless connection, power may be supplied to the user-upgradeable modular component keyboard via dry cell or rechargeable battery. For example, in an embodiment described with reference to FIG. 1, the user-upgradeable modular component keyboard 121 in an embodiment may include the keyboard battery 141, which may be either a dry cell battery or a rechargeable battery to provide power to the keyboard controller 142 and the keyboard wireless adapter and network interface device 143. In one example embodiment described with reference to FIG. 2B, a first wireless communication replaceable keyboard power and connectivity module 240 may be formed to include a dry cell battery which may be user-replaceable for powering the user-upgradeable modular-component keyboard 220. As another example embodiment described with reference to FIG. 3A, a wireless communication replaceable keyboard power and connectivity module 340 may include a rechargeable battery, which may be recharged by receiving direct current (DC) power from a wall outlet or from the information handling system, via the power connector 349.

At block 514, the user-upgradeable modular component keyboard in an embodiment may be operatively coupled to an information handling system, via a wireless connection. For example, in an embodiment described with reference to FIG. 1, the replaceable keyboard power and connectivity module 140 may establish a wireless link with the information handling system 100 via a wireless connection between the keyboard wireless adapter and network interface device 143 and the network interface device 160 of the information handling system 100. More specifically, such a wireless link may be established in accordance with wide personal area network (WPAN) standards, including Bluetooth® technology, or Bluetooth Low Energy (BLE) technology.

In another example embodiment described with reference to FIG. 2C, the wireless replaceable keyboard power and connectivity module 240 in an embodiment may incorporate a radio-frequency (RF) transparent window 248 through which wireless links may be established between the wireless adapter of the wireless replaceable keyboard power and connectivity module 240 and a wireless network interface device of an operatively coupled information handling system. In another example embodiment described with reference to FIG. 3A, the information handling system may be operatively coupled to the replaceable keyboard power and connectivity module 340 via a wireless link. For example, the wireless replaceable keyboard power and connectivity module 240 in an embodiment may establish wireless links between the wireless adapter of the wireless replaceable keyboard power and connectivity module 240 and a wireless network interface device of an operatively coupled information handling system.

In such a way, a user-upgradeable modular component keyboard capable of wireless connection to an information handling system may be assembled using interchangeable, replaceable, modular components. The method for assembling a plurality of interchangeable, replaceable, and modular components together to form a user-upgradeable modular-component keyboard may then end.

The blocks of the flow diagram of FIGS. 4 and 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A user-upgradeable modular component keyboard for an information handling system comprising:
   a replaceable keyboard layout structure having a plurality of keys, operatively coupled to a replaceable keyboard power and connectivity module to detect and communicate to the replaceable keyboard power and connectivity module an indication of keystrokes actuated by a user, where the operative coupling includes a key switch data connector and a releasable module fastener;
   the replaceable keyboard power and connectivity module housing a keyboard controller for communication of the keystrokes to the information handling system and a keyboard battery for powering the keyboard controller;
   the replaceable keyboard power and connectivity module having a first side of the key switch data connector to operatively couple to a second side of the key switch data connector on the replaceable keyboard layout structure for transfer of data and power between the replaceable keyboard power and connectivity module and the replaceable keyboard layout structure; and the replaceable keyboard power and connectivity module having a first side of the releasable module fastener for operative coupling of the replaceable keyboard power and connectivity module to a second side of the releasable module fastener of the replaceable keyboard layout structure.

2. The user-upgradeable modular component keyboard of claim 1 further comprising:

the replaceable keyboard power and connectivity module being separable from the replaceable keyboard layout structure by a user exerting force to overcome a magnetic coupling between the first side of the releasable module fastener and the second side of the releasable module fastener, where the releasable module fastener is a magnetic fastener.

3. The user-upgradeable modular component keyboard of claim 1 further comprising:

a plurality of replaceable keyboard height and angle adjustment feet operatively coupled to the replaceable keyboard layout structure via a plurality of releasable foot fasteners.

4. The user-upgradeable modular component keyboard of claim 1 further comprising:

the replaceable keyboard power and connectivity module housing a network interface device having a communication port for establishing a wired link with the information handling system.

5. The user-upgradeable modular component keyboard of claim 1 further comprising:

the replaceable keyboard power and connectivity module housing a wireless adapter and keyboard radio for establishing a wireless link with the information handling system.

6. The user-upgradeable modular component keyboard of claim 1, wherein the keyboard battery is a dry cell battery.

7. The user-upgradeable modular component keyboard of claim 1, wherein the keyboard battery is a rechargeable battery.

8. A method of assembling a user-upgradeable modular component keyboard for an information handling system comprising:

operatively coupling a first replaceable keyboard layout structure with a plurality of keys, to a replaceable keyboard power and connectivity module housing a keyboard controller where the keyboard controller in the replaceable keyboard power and connectivity module detects and communicates to the replaceable keyboard power and connectivity module an indication of keystrokes actuated by a user;

operatively coupling the replaceable keyboard power and connectivity module, via a key switch data connector, to the keyboard power and connectivity module port of the replaceable keyboard layout structure for transfer of data and power between the replaceable keyboard power and connectivity module and the replaceable keyboard layout structure; and magnetically coupling the replaceable keyboard power and connectivity module, via a releasable module fastener, to the replaceable keyboard layout structure such that the replaceable keyboard power and connectivity module is separable from the replaceable keyboard layout structure by a user exerting force to overcome a magnetic coupling between a first side of the releasable module fastener in the replaceable keyboard power and connectivity module and a second side of the releasable module fastener in the replaceable keyboard layout structure.

9. The method of claim 8 further comprising:

replacing the first replaceable keyboard layout structure with a second replaceable keyboard layout structure by magnetically and operatively de-coupling the first replaceable keyboard layout structure from the replaceable keyboard power and connectivity module; and operatively and magnetically coupling the second replaceable keyboard layout structure to the replaceable keyboard power and connectivity module for re-use of the replaceable keyboard power and connectivity module.

10. The method of claim 8 further comprising:

operatively coupling each of a plurality of replaceable keyboard height and angle adjustment feet to the first replaceable keyboard layout structure, via a plurality of releasable foot fasteners.

11. The method of claim 10 further comprising:

replacing the first replaceable keyboard layout structure with a second replaceable keyboard layout structure by magnetically de-coupling the first replaceable keyboard layout structure from the plurality of replaceable keyboard height and angle adjustment feet; and magnetically coupling the second replaceable keyboard layout structure to the plurality of replaceable keyboard height and angle adjustment feet for re-use of the plurality of replaceable keyboard height and angle adjustment feet.

12. The method of claim 8 further comprising:

operatively coupling the keyboard controller to a power connector on the replaceable keyboard power and connectivity module for receiving power from the information handling system.

13. The method of claim 8 further comprising:

operatively coupling the keyboard controller to a dry cell keyboard battery of the replaceable keyboard power and connectivity module for supplying power to the keyboard controller and a network interface device of the replaceable keyboard power and connectivity module.

14. The method of claim 8 further comprising:

operatively coupling the keyboard controller to a rechargeable keyboard battery of the replaceable keyboard power and connectivity module for supplying power to the keyboard controller and a network interface device of the replaceable keyboard power and connectivity module.

15. A user-upgradeable modular component keyboard for an information handling system comprising:

a replaceable keyboard layout structure having a plurality of keys and operatively coupled to a replaceable keyboard power and connectivity module to detect and communicate to the replaceable keyboard power and connectivity module an indication of keystrokes actuated by a user, where the operative coupling between the replaceable keyboard layout structure and the replaceable keyboard power and connectivity module includes a key switch data connector and a releasable module fastener;

the replaceable keyboard power and connectivity module housing a keyboard controller for communication of the keystrokes to the information handling system and a keyboard battery for powering the keyboard controller;

the replaceable keyboard power and connectivity module having a key switch data connector first side to operatively couple to a key switch data connector second side located on the replaceable keyboard layout structure for transfer of data and power between the replaceable keyboard power and connectivity module and the replaceable keyboard layout structure;

the replaceable keyboard power and connectivity module having a releasable module fastener first side for operative coupling of the replaceable keyboard power and connectivity module to a releasable module fastener second side located on the replaceable keyboard layout structure; and a replaceable keyboard height and angle adjustment foot operatively coupled to the replaceable keyboard layout structure via a releasable foot fastener.

16. The user-upgradeable modular component keyboard of claim 15 further comprising:

the replaceable keyboard power and connectivity module being separable from the replaceable keyboard layout structure by a user exerting force to overcome a magnetic coupling between the releasable module fastener first side and the releasable module fastener second side, where the releasable module fastener is a magnetic fastener.

17. The user-upgradeable modular component keyboard of claim 15 further comprising:

the replaceable keyboard height and angle adjustment foot being separable from the replaceable keyboard layout structure by a user exerting force to overcome a magnetic coupling between a releasable foot fastener first side located on the replaceable keyboard height and angle adjustment foot and a releasable foot fastener second side located on the replaceable keyboard layout structure, where the releasable foot fastener is a magnetic fastener.

18. The user-upgradeable modular component keyboard of claim 15 further comprising:

the keyboard controller operatively coupled to the rechargeable keyboard battery of the replaceable keyboard power and connectivity module; and the replaceable keyboard power and connectivity module having a power connector for receiving power from the information handling system to recharge the rechargeable battery.

19. The user-upgradeable modular component keyboard of claim 15, wherein the replaceable keyboard layout structure includes haptic keys for the plurality of keys.

20. The user-upgradeable modular component keyboard of claim 15, wherein the replaceable keyboard layout structure includes mechanical key mechanisms for the plurality of keys.

* * * * *